United States Patent
Torimoto et al.

(10) Patent No.: US 9,553,631 B2
(45) Date of Patent: Jan. 24, 2017

(54) NAVIGATION SIGNAL TRANSMITTING APPARATUS, LOCATION INFORMATION PROVIDING APPARATUS, METHOD FOR TRANSMITTING NAVIGATION SIGNAL, AND METHOD FOR PROVIDING LOCATION INFORMATION

(75) Inventors: Hideyuki Torimoto, Tokyo (JP); Makoto Ishii, Tokyo (JP); Masahiro Asako, Tokyo (JP); Kazuki Okano, Tokyo (JP); Yuzo Matsuzawa, Tokyo (JP); Yoichi Takahashi, Tokyo (JP)

(73) Assignee: GNSS Technologies Inc., Tokyo (JP)

( * ) Notice: Subject to any disclaimer, the term of this patent is extended or adjusted under 35 U.S.C. 154(b) by 851 days.

(21) Appl. No.: 13/823,749

(22) PCT Filed: Sep. 6, 2011

(86) PCT No.: PCT/JP2011/070277
§ 371 (c)(1),
(2), (4) Date: Mar. 15, 2013

(87) PCT Pub. No.: WO2012/036028
PCT Pub. Date: Mar. 22, 2012

(65) Prior Publication Data
US 2013/0279543 A1    Oct. 24, 2013

(30) Foreign Application Priority Data
Sep. 16, 2010   (JP) ................................ 2010-208442

(51) Int. Cl.
*G01S 19/11*      (2010.01)
*H04B 1/69*      (2011.01)
(Continued)

(52) U.S. Cl.
CPC .............. *H04B 1/69* (2013.01); *G01C 21/206* (2013.01); *G01S 19/11* (2013.01); *G01S 19/48* (2013.01); *H04W 4/02* (2013.01)

(58) Field of Classification Search
CPC .......... H04B 1/69; H04W 4/02; G01C 21/206; G01C 19/11; G01C 19/48
(Continued)

(56) References Cited

U.S. PATENT DOCUMENTS 5,913,170 A * 6/1999 Wortham .............. G01S 5/0263
                                              342/357.31
6,107,961 A    8/2000 Takagi
(Continued)

FOREIGN PATENT DOCUMENTS

EP      2233943 A1    9/2010
JP   2000-180527 A    6/2000
(Continued)

OTHER PUBLICATIONS

Machine Language Translation of JP009/174922A, 2009.*
(Continued)

Primary Examiner — Frank J McGue
(74) Attorney, Agent, or Firm — Osha Liang LLP

(57) ABSTRACT

A navigation signal transmitting apparatus and a location information providing apparatus are provided for reducing time of positioning with a positioning signal from an indoor positioning transmitter. When an information providing server recognizes a transmitter ID of a transmitter from a mobile phone, the server makes reference refers to database associated with the transmitter ID, and reads SVG map information associated with the ID (including information for displaying a map and information of a correspondence relation between the transmitter ID and the location of the transmitter on the map). When the server transmits data of the SVG map information to a base station, the base station wirelessly emits the data of the SVG map information.
(Continued)

When the mobile phone detects arrival of the data, the mobile phone can obtain the location of the transmitter from the data in accordance with a browsing operation of a user of the phone.

20 Claims, 25 Drawing Sheets

(51) Int. Cl.
*G01C 21/20* (2006.01)
*H04W 4/02* (2009.01)
*G01S 19/48* (2010.01)

(58) Field of Classification Search
USPC .................................................. 342/357.48
See application file for complete search history.

(56) References Cited

U.S. PATENT DOCUMENTS

| | | | |
|---|---|---|---|
| 2002/0171581 A1* | 11/2002 | Sheynblat | G01S 5/0036 342/357.46 |
| 2006/0287813 A1 | 12/2006 | Quigley | |
| 2009/0115661 A1 | 5/2009 | Torimoto et al. | |
| 2009/0315765 A1 | 12/2009 | Chen | |
| 2010/0290504 A1 | 11/2010 | Torimoto et al. | |
| 2011/0050493 A1 | 3/2011 | Torimoto et al. | |

FOREIGN PATENT DOCUMENTS

| | | |
|---|---|---|
| JP | 3503397 B2 | 3/2004 |
| JP | 2006-67086 A | 3/2006 |
| JP | 2006-266876 A | 10/2006 |
| JP | 2007-511120 A | 4/2007 |
| JP | 2007-278756 A | 10/2007 |
| JP | 2009-85928 A | 4/2009 |
| JP | 2009-133731 A | 6/2009 |
| JP | 2009-174922 A | 8/2009 |
| JP | 2010-3283 A | 1/2010 |

OTHER PUBLICATIONS

Search Report issued in corresponding European Application No. 11825034.9, mailed Oct. 9, 2014 (7 pages).
International Search Report issued in PCT/JP2011/070277 mailed Dec. 20, 2011 (4 pages).
Espacenet Abstract Publication No. JP2009133731A dated Jun. 18, 2009 (1 page).
Espacenet Abstract Publication No. JP2010003283A dated Jan. 7, 2010 (1 page).
Espacenet Abstract Publication No. JP2007511120A dated Apr. 26, 2007 (1 page).
Espacenet Abstract Publication No. JP2006266876A dated Oct. 5, 2006 (1 page).
Espacenet Abstract Publication No. JP2009085928A dated Apr. 23, 2009 (1 page).
Espacenet Abstract Publication No. JP2006067086A dated Mar. 9, 2006 (1 page).
Espacenet Abstract Publication No. JP2000180527A dated Jun. 30, 2000 (1 page).
Espacenet Abstract Publication No. JP2007278756A dated Oct. 25, 2007 (1 page).
Espacenet Abstract Publication No. JP3503397B2 dated Mar. 2, 2004 (1 page).

* cited by examiner

NAVIGATION SIGNAL TRANSMITTING APPARATUS, LOCATION INFORMATION PROVIDING APPARATUS, METHOD FOR TRANSMITTING NAVIGATION SIGNAL, AND METHOD FOR PROVIDING LOCATION INFORMATION

TECHNICAL FIELD

The present invention relates to a technique for providing location information, and relates to a navigation signal transmitting apparatus for transmitting a navigation signal and a location information providing apparatus. More particularly, the present invention relates to a technique for providing location information even in an environment out of reach of a signal transmitted from a satellite that emits a positioning signal.

BACKGROUND ART

GPS (Global Positioning System) has been known as a conventional positioning system. A satellite (hereinafter, referred to as "GPS satellite") for emitting a signal used for the GPS (hereinafter, referred to as a "GPS signal") flies at an altitude of about 20,000 km from the ground. By receiving and demodulating a signal emitted from the GPS satellite, a user can measure a distance between the GPS satellite and the user. Therefore, if there is no obstacle between the ground and the GPS satellite, positioning is possible using the signal emitted from the GPS satellite. Assume, however, use of the GPS in an urban area. It may often the case that the signal emitted from the GPS satellite cannot be received by a location information providing apparatus of the user, hindered by high buildings standing in large numbers. Further, diffraction or reflection of the signal by a building may cause an error in the distance measurement using the signal and, as a result, positioning accuracy is often degraded.

Though a technique has been known to receive in a room a weak GPS signal that has passed through a wall or roof, state of reception is unstable and positioning accuracy is low.

In the foregoing, the positioning using the GPS has been described by way of example. The phenomenon described above, however, is common to positioning systems using satellites in general. The satellite positioning system is not limited to the GPS, and it may include systems such as GLONASS (GLObal NAvigation Satellite System) of Russian Federation and Galileo of Europe, for example.

Technique related to provision of location information is disclosed, for example, in Japanese Patent Laying-Open No. 2006-67086 (Patent Literature 1).

According to the technique disclosed in Japanese Patent Laying-Open No. 2006-67086, however, the reader or writer is unique to the system for providing location information and lacks versatility. In order to prevent interference, it is necessary to restrain transmission output, and therefore, the area in which location information is receivable is limited and it is difficult to obtain location information continuously. Further, a very large number of transmitters are required to cover a wide area.

Further, in connection with obtainment or notification of location information, it is possible to locate a source of signal transmission if a telephone call is made from, for example, a fixed telephone, as the location of the fixed telephone is known in advance. Wide-spread use of mobile phones, however, makes mobile communication more and more common and it becomes increasingly difficult to notify the location information of the caller, unlike in the case of a fixed telephone. On the other hand, concerning emergency call, legislation is prompted toward inclusion of location information in a call from a mobile phone.

A conventional mobile phone having a positioning function obtains location information in a place where a signal from a satellite is receivable, and therefore, it is possible to notify the location of the mobile phone. In a place where it is impossible to receive radio wave, such as in an underground mall or indoors, however, location information cannot be obtained by the conventional positioning technique.

In view of the foregoing, a technique may be considered in which a plurality of transmitters capable of emitting signals similar to the GPS signal are arranged indoors to find the location based on the principle of trilateration similar to the GPS (for example, see Japanese Patent Laying-Open No. 2000-180527 (Patent Literature 2)). Such an approach, however, requires that the transmitters are synchronized in time, increasing the cost of transmitters.

The invention disclosed in Patent Literature 2 relates to a technique of reducing influence of multipath and the like, utilizing the fact that objects that block or reflect radio waves are arranged at prescribed positions with respect to a direction of movement of a receiving terminal for positioning.

Further, Japanese Patent Laying-Open No. 2007-278756 (Patent Literature 3) discloses a technique of simplifying a system configuration for indoor positioning and improving accuracy of the positioning, by controlling transmission power indoors and by transmitting location information in a format compatible with GPS signal indoors, rather than the trilateration mentioned above.

CITATION LIST

Patent Literature

PTL 1: Japanese Patent Laying-Open No. 2006-67086
PTL 2: Japanese Patent Laying-Open No. 2000-180527
PTL 3: Japanese Patent Laying-Open No. 2007-278756
PTL 4: Japanese Patent No. 3503397

SUMMARY OF INVENTION

Technical Problem

However, generally, in order to provide location information indoors, an indoor map needs to be stored in the receiver because it is insufficient to simply specify the location of a receiver (or the location of an indoor transmitter in the technique of Patent Literature 3) from an indoor transmitter.

Meanwhile, an SVG (Scalable Vector Graphics) technique has been known as a technique allowing a map to be displayed in a scalable manner. As a map employing the SVG technique, for example, Geospatial Information Authority of Japan discloses information with regard to maps of cities in Japan. The SVG technique has the following features:

1) The SVG is an "open standard" format internationally standardized by global standards bodies such as W3C and OMA;

2) Realization of services not depending on devices or platforms, and continuous use of the data are guaranteed;

3) The SVG is "XML data having meaning information", and allows a client side to dynamically control what to be displayed when combining contents, in accordance with the user's context; and 4) The SVG is a vector-based image format, and allows for high-quality scale-up/down and rotation of a map image.

Japanese Patent No. 3503397 (Patent Literature 4) or the like discloses a technique of displaying a map in cooperation with a plurality of geographical information servers using scalable map information, such as the SVG, which is map information that can be mutually referenced, for example.

However, problems such as delay in display of the current location will arise if scalable map data such as the above-described SVG is used as an indoor map and the receiver cannot appropriately process such an indoor map and information for arrangement of indoor transmitters.

Further, the problems such as delay in display of the current location will also arise if transition is made from a state of indoor positioning to a state of outdoor positioning and the receiver does not have the latest information necessary for the outdoor positioning such as orbit information of positioning satellites.

The present invention has been made to solve the foregoing problems, and has its object to provide a navigation signal transmitting apparatus and a location information providing apparatus so as to achieve reduced time of positioning with a positioning signal from an indoor positioning transmitter.

Another object of the present invention is to provide a navigation signal transmitting apparatus and a location information providing apparatus so as to achieve improved positioning accuracy and reduced time of positioning when handing over from indoor positioning to outdoor positioning.

An object of another aspect of the present invention is to provide a method for transmitting a navigation signal and a method for providing location information, so as to achieve reduced time of positioning with a positioning signal from an indoor positioning transmitter.

An object of still another aspect of the present invention is to provide a method for transmitting a navigation signal and a method for providing location information, so as to achieve improved positioning accuracy and reduced time of positioning when handing over from indoor positioning to outdoor positioning.

Solution to Problem

According to a certain embodiment, there is provided a navigation signal transmitting apparatus, installed in a facility on a ground, for transmitting a navigation signal to a receiver capable of performing positioning by receiving spectrum spread satellite positioning signals from a plurality of positioning satellites. The navigation signal transmitting apparatus includes: a transmission antenna; a storage for storing identification information for specifying the navigation signal transmitting apparatus among a plurality of navigation signal transmitting apparatuses installed in the facility, and resource identification information for specifying a location of an external device on a network to obtain map information indicative of inside of the facility; a message generator for generating a message signal of the identification information and the resource identification information to be included in the navigation signal; a modulator for generating the navigation signal by modulating the message signal through a modulation process including a spectrum spread process based on the same type of a spread code as that of each of the satellite positioning signals, the spread code being allotted to the navigation signal transmitting apparatus in advance; and a transmitter for transmitting the navigation signal from the transmission antenna.

Preferably, the navigation signal has a signal format compatible with a signal format of the satellite positioning signal.

Preferably, the message generator generates the message signal including the identification information, in accordance with a signal format having the shortest signal repeating cycle among a plurality of signal formats compatible with the signal format of the satellite positioning signal.

According to another embodiment, there is provided a location information providing apparatus capable of performing positioning by receiving spectrum spread satellite positioning signals from a plurality of positioning satellites, and providing location information using a plurality of navigation signals, which are spread spectrum signals from a plurality of navigation signal transmitting apparatuses installed in a facility on a ground and which respectively include pieces of identification information for specifying the navigation signal transmitting apparatuses in the facility. The location information providing apparatus includes: a receiver for receiving the spread spectrum signals; a communication circuit for communicating with an external device on a network; a memory for storing a plurality of patterns of spread codes for the navigation signals, the spread codes being of the same type as those for the satellite positioning signals; demodulators provided in parallel for identifying and demodulating the plurality of navigation signals by performing correlation processes for the plurality of patterns of the spread codes in parallel; an extractor for obtaining resource identification information for specifying a location of the external device on the network from the navigation signal from a predetermined one of the navigation signal transmitting apparatuses, and extracting the identification information from one of the plurality of navigation signals identified, when the navigation signals have been successfully identified and demodulated; and a map rendering processor for obtaining, from the external device using the communication circuit based on the resource identification information, map information for displaying a map of inside of the facility and correspondence information indicating a correspondence relation between the identification information and the location of the navigation signal transmitting apparatus in the facility, and generating an image signal for displaying an map image indicating a location of the navigation signal transmitting apparatus, from which the identification information has been received, on the map of the inside of the facility.

Preferably, the navigation signal has a signal format compatible with a signal format of the satellite positioning signal.

Preferably, the map information is data of a SVG (Scalable Vector Graphics) format, and the correspondence information is described as data of the SVG format.

Preferably, the correspondence information collectively includes correspondence relations between locations of the plurality of navigation signal transmitting apparatuses included in the map information and the plurality of pieces of identification information. The demodulators perform the correlation processes using a selected one of the spread codes based on the correspondence information.

Preferably, when obtaining the map information from the external device, the extractor also obtains satellite orbit data for the positioning satellites from the external device.

The location information providing apparatus further includes an outdoor positioning circuit for performing positioning using the satellite orbit data obtained from the external device, when performing positioning by receiving the satellite positioning signals from the plurality of positioning satellites.

According to still another embodiment, there is provided a method for transmitting a navigation signal from a facility on a ground to a receiver capable of performing positioning by receiving spectrum spread satellite positioning signals from a plurality of positioning satellites. The method includes the steps of: preparing identification information for specifying the navigation signal transmitting apparatus among a plurality of navigation signal transmitting apparatuses installed in the facility, and resource identification information for specifying a location of an external device on a network to obtain map information indicative of inside of the facility; generating a message signal of the identification information and the resource identification information to be included in the navigation signal; generating the navigation signal by modulating the message signal through a modulation process including a spectrum spread process based on the same type of a spread code as that of each of the satellite positioning signals, the spread code being allotted to the navigation signal transmitting apparatus in advance; and transmitting the navigation signal from the transmission antenna.

Preferably, the navigation signal has a signal format compatible with a signal format of the satellite positioning signal.

Preferably, the step of generating the message signal includes the step of generating the message signal including the identification information, in accordance with a signal format having the shortest signal repeating cycle among a plurality of signal formats compatible with the signal format of the satellite positioning signal.

According to yet another embodiment, there is provided a method, which allows for positioning by receiving spectrum spread satellite positioning signals from a plurality of positioning satellites, for providing location information using a plurality of navigation signals, which are spread spectrum signals from a plurality of navigation signal transmitting apparatuses installed in a facility on a ground and which respectively include pieces of identification information for specifying the navigation signal transmitting apparatuses in the facility. The method includes the steps of: receiving the spread spectrum signals; communicating with an external device on a network; storing a plurality of patterns of spread codes for the navigation signals, the spread codes being of the same type as those for the satellite positioning signals; identifying and demodulating the plurality of navigation signals by performing correlation processes for the plurality of patterns of the spread codes in parallel; obtaining resource identification information for specifying a location of the external device on the network from the navigation signal from a predetermined one of the navigation signal transmitting apparatuses, and extracting the identification information from one of the plurality of navigation signals identified, when the navigation signals have been successfully identified and demodulated; and obtaining, from the external device based on the resource identification information, map information for displaying a map of inside of the facility and correspondence information indicating a correspondence relation between the identification information and the location of the navigation signal transmitting apparatus in the facility, and generating an image signal for displaying an map image indicating a location of the navigation signal transmitting apparatus, from which the identification information has been received, on the map of the inside of the facility.

Preferably, the navigation signal has a signal format compatible with a signal format of the satellite positioning signal.

Preferably, the map information is data of a SVG (Scalable Vector Graphics) format, and the correspondence information is described as data of the SVG format.

Preferably, the correspondence information collectively includes correspondence relations between locations of the plurality of navigation signal transmitting apparatuses included in the map information and the plurality of pieces of identification information. The step of demodulating includes the step of performing the correlation processes using a selected one of the spread codes based on the correspondence information.

Preferably, when obtaining the map information from the external device, the step of extracting includes the step of also obtaining satellite orbit data for the positioning satellites from the external device. The method further includes the step of performing positioning using the satellite orbit data obtained from the external device, when performing positioning by receiving the satellite positioning signals from the plurality of positioning satellites.

Advantageous Effects of Invention

In a certain embodiment, according to a navigation signal transmitting apparatus and a location information providing apparatus of the present invention, time of positioning with a positioning signal from an indoor positioning transmitter can be reduced in a receiver.

Further, in another embodiment, according to a navigation signal transmitting apparatus and a location information providing apparatus of the present invention, positioning accuracy can be improved and positioning time can be shorter in a receiver when handing over from indoor positioning to outdoor positioning.

The foregoing and other objects, features, aspects and advantages of the present invention will become more apparent from the following detailed description of the present invention when taken in conjunction with the accompanying drawings.

DESCRIPTION OF EMBODIMENTS

Figure 1:
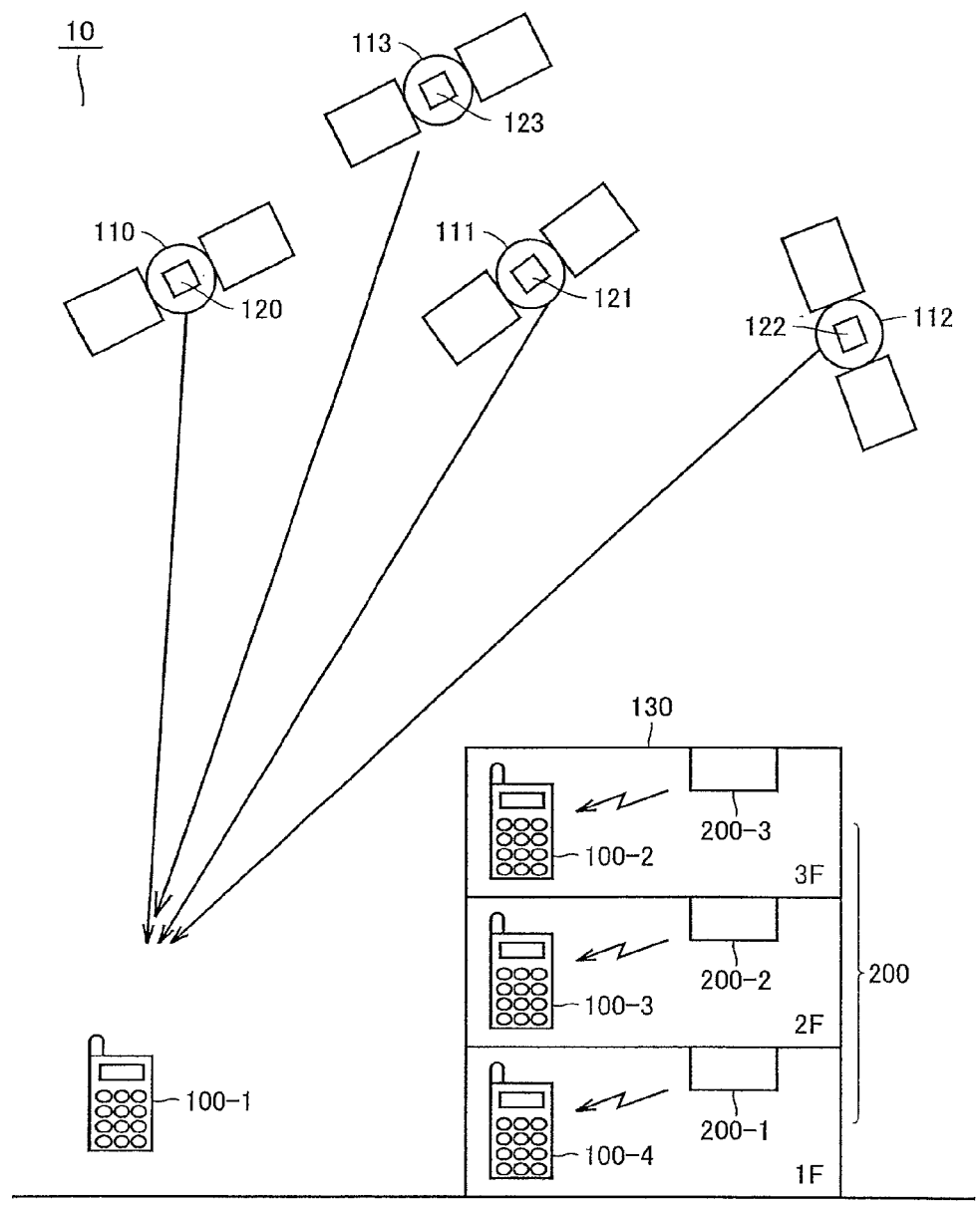
FIG. 1 shows a configuration of a location information providing system 10.

The following describes embodiments of the present invention with reference to figures. In the description below, the same components are given the same reference characters. Their names and functions are also the same. Therefore, detailed description thereof will not be repeated.

<First Embodiment>

Referring to FIG. 1, a location information providing system 10 in accordance with a first embodiment of the present invention will be described. FIG. 1 shows a configuration of location information providing system 10. Location information providing system 10 includes: GPS satellites 110, 111, 112 and 113 flying at an altitude of about 20,000 km above the ground and emitting signals for positioning (hereinafter, referred to as "positioning signals"); and location information providing apparatuses 100-1 to 100-4 functioning as apparatuses for providing location information. Location information providing apparatuses 100-1 to 100-4 will be generally referred to as a "location information providing apparatus 100". Location information providing apparatus 100 has a hardware configuration similar to that of a terminal having a conventional positioning apparatus such as a mobile phone, a car navigation system, or other mobile positioning apparatuses. However, location information providing apparatus 100 according to the embodiment of the present invention is implemented as a terminal apparatus also capable of positioning indoors by changing firmware and other software.

Here, the positioning signal is a so-called spread spectrum signal and, by way of example, it is a so-called GPS signal. The signal, however, is not limited to the GPS signal. In the following, for simplicity of description, the positioning system will be described using the GPS as an example. The present invention is also applicable to other satellite positioning systems (such as Galileo and QZSS (Quasi-Zenith Satellite System)).

Center frequency of the positioning signal is, by way of example, 1575.42 MHz. Spreading frequency of the positioning signal is, by way of example, 1.023 MHz. Here, the frequency of the positioning signal becomes the same as that of a C/A (Coarse and Access) signal or L1C signal in a L1 band of the existing GPS. This means that a front end of an existing positioning signal receiving circuit (such as a GPS signal receiving circuit) can be used, and therefore, location information providing apparatus 100 can receive the positioning signal simply by changing software for processing signals from the front end, without adding any new hardware circuit.

In another aspect, the positioning signal may be modulated with a rectangular wave of 1.023 MHz. In that case, if the data channel of the modulated signal is the same as that of the positioning signal planned for new transmission in the L1 band, the user can receive the positioning signal using a receiver that can receive and process the new GPS signal. The frequency of the rectangular wave is preferably 1.023 MHz. The frequency for modulation can be determined based on a trade-off with spectrum separation for avoiding interference with an existing C/A signal and/or other signals. It is noted that a manner of modulation is not limited to this.

GPS satellite 110 has a transmitter 120 mounted thereon, for emitting the positioning signal. GPS satellites 111, 112 and 113 have similar transmitters 121, 122 and 123 mounted, respectively.

Location information providing apparatuses 100-2, 100-3 and 100-4 having functions similar to those of location information providing apparatus 100-1 are usable at places where radio wave reception is difficult, such as in a building 130, as will be described in the following. Specifically, on the ceiling of the first floor of building 130, an indoor transmitter 200-1 is attached. Location information providing apparatus 100-4 receives the positioning signal emitted from indoor transmitter 200-1. Similarly, indoor transmitters 200-2 and 200-3 are respectively attached to the ceilings of the second and third floors of building 130. Here, time of each of indoor transmitters 200-1, 200-2 and 200-3 (hereinafter, referred to as "ground time") may be independent from the times of GPS satellites 110, 111, 112 and 113

(hereinafter, referred to as "satellite times"), and need not be in synchronization necessarily. It is noted, however, that the satellite times must be synchronized with each other. Therefore, the satellite time is controlled by an atomic clock mounted on each satellite. It is preferred that indoor transmitters 200-1, 200-2 and 200-3 are in synchronization with each other in time, that is, in ground time, as needed.

However, in the present invention, synchronization between the time of each of indoor transmitters 200-1, 200-2, 200-3 and each satellite time can be achieved with a relatively simple device configuration. Hence, when the satellite time and the ground time needs to be synchronized with each other as a configuration of the system, such synchronization can be achieved.

The spread spectrum signal emitted as a positioning signal from each transmitter of the GPS satellites is generated by modulating a navigation message with a PRN (Pseudo Random Noise) code. The navigation message includes time data, orbit information, almanac, and ionosphere correction data. Each of transmitters 120 to 123 further holds data (for example, PRN-ID (Identification)) for identifying each of transmitters 120 to 123 itself or for identifying each of the GPS satellites on which transmitters 120 to 123 are mounted.

Location information providing apparatus 100 has data for generating each pseudo random noise code and a code generator. When receiving a positioning signal, location information providing apparatus 100 executes a demodulation process, which will be described later, using a code pattern of a pseudo random noise code allotted to the transmitter of each satellite or to each indoor transmitter, whereby it can specify a satellite or an indoor transmitter having emitted the received signal. Further, the L1C signal, which is one of positioning signals, includes a PRN-ID in the data, and therefore, it is possible to prevent signal acquisition and tracking using an erroneous code pattern, which is likely when the reception level is low.

[Transmitter Mounted on GPS Satellite]

The configuration of the transmitter mounted on each GPS satellite is well known. Hence, the following describes gist of the configuration of the transmitter mounted on each GPS satellite. Each of transmitters 120, 121, 122, 123 includes the atomic clock, a storage for storing data, an oscillation circuit, a processing circuit for generating the positioning signal, an encoding circuit for spread-spectrum coding of the signal generated by the processing circuit, a transmission antenna, and the like. The storage stores a navigation message having ephemeris, almanac of each satellite, ionosphere correction data, and the like. In the case where each transmitter transmits an L1C/A signal, the processing circuit generates a positioning signal in accordance with a code pattern that can be the PRN-ID. Hence, when the code pattern of a received positioning signal is specified, a transmitter having transmitted the positioning signal is identified.

Meanwhile, in the case where each transmitter transmits an L1C signal, the storage stores a PRN-ID. In this case, the processing circuit generates a positioning signal including the PRN-ID. Accordingly, when the positioning signal generated as the L1C signal is received, the PRN-ID is obtained from the positioning signal.

The processing circuit generates a message for transmission, using time information from the atomic clock and various data stored in the storage.

Here, the code pattern of the pseudo random noise code for spread-spectrum coding is defined beforehand for each of transmitters 120 to 123. Each code pattern differs transmitter by transmitter (that is, GPS satellite by GPS satellite). The encoding circuit performs spectrum-spreading of the message using such a pseudo random noise code. Each of transmitters 120 to 123 converts the thus encoded signal to high frequency, and emits the resulting signal to the space through the transmission antenna.

As described above, each of transmitters 120 to 123 emits spread spectrum signal not causing harmful interference with other transmitters. Here, the "harmful interference" can be securely avoided by the output level so restrained as to prevent any interference. Alternatively, no harmful interference can be also realized by a manner of separating spectrum. The signal is transmitted using, for example, a carrier wave referred to as L1 band. Transmitters 120, 121, 122, 123 emit positioning signals having the same frequency, for example, in accordance with a spread spectrum communication method. Therefore, even when positioning signals transmitted from respective satellites are received by one location information providing apparatus 100-1, the respective positioning signals can be received without cross-talk.

As with the signals transmitted from the satellites, positioning signals from the plurality of indoor transmitters on the ground can be received without cross-talk.

[Hardware Configuration of Indoor Transmitter 200]

Figure 2:
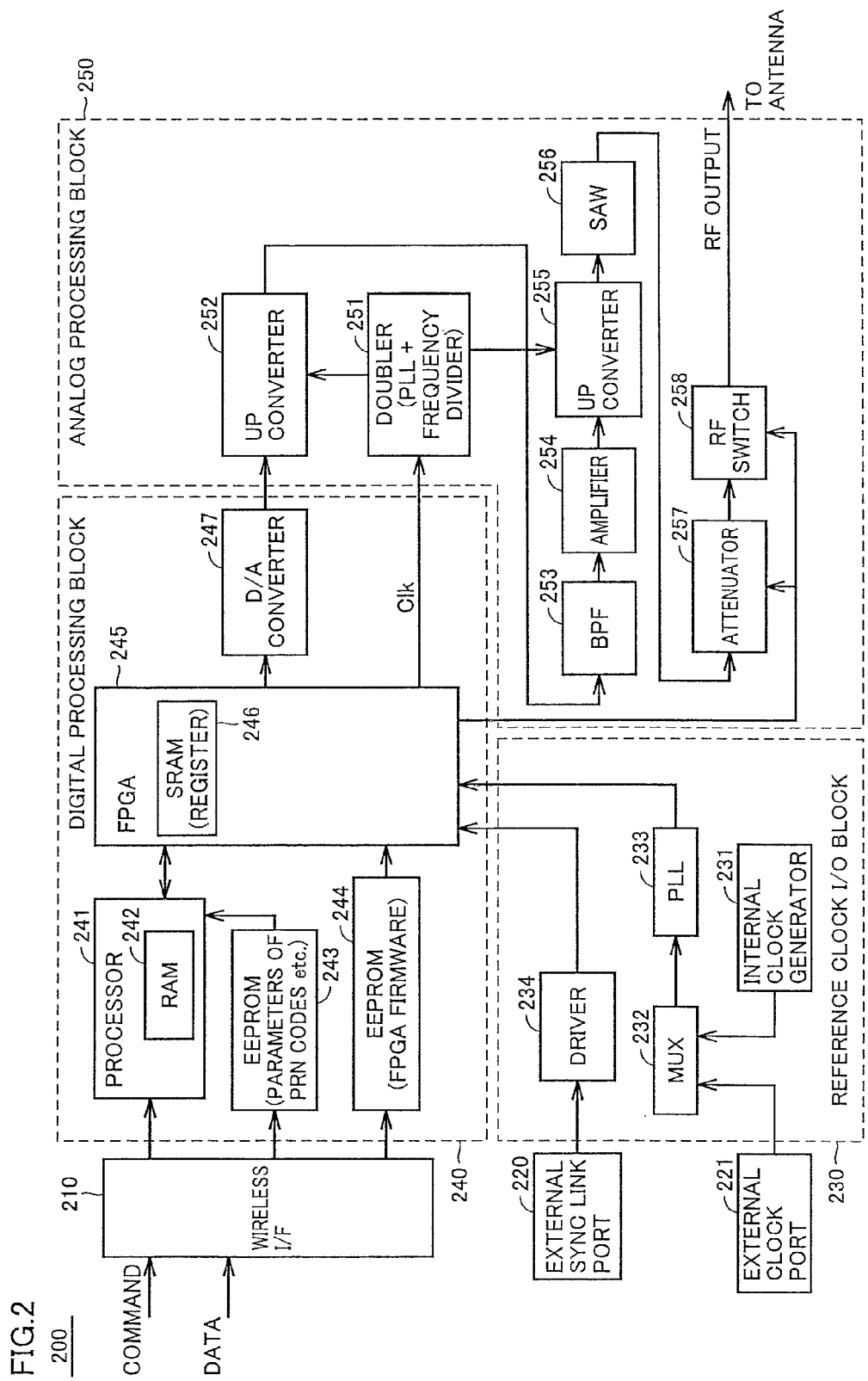
FIG. 2 is a block diagram showing a hardware configuration of an indoor transmitter 200.

Referring to FIG. 2, indoor transmitter 200 will be described. FIG. 2 is a block diagram showing a hardware configuration of indoor transmitter 200. It is noted that indoor transmitter 200 is a collective designation of indoor transmitters 200-1, 200-2, 200-3.

Indoor transmitter 200 includes: a wireless interface (hereinafter, referred to as "wireless I/F") 210; a digital processing block 240; a reference clock input/output block (hereinafter, referred to as "reference clock I/O block") 230 electrically connected to digital processing block 240 for supplying a reference clock for operations of various circuit portions; an analog processing block 250 electrically connected to digital processing block 240; an antenna (not shown) electrically connected to analog processing block 250 for transmitting a signal for positioning; and a power source (not shown) for supplying power supply potential to various portions of indoor transmitter 200.

The power source may be provided inside indoor transmitter 200, or external power supply may be received.

[Wireless Communication Interface]

Wireless I/F 210 is an interface for wireless communication, and is adapted to receive external commands, receive setting parameters or program data (such as firmware) from the outside, or transmit data to the outside as needed, by wireless communication using near field communication such as Bluetooth, PHS (Personal Handy-phone System), or mobile phone network.

Since indoor transmitter 200 has wireless I/F 210 as such, it is possible to change the setting parameters such as location data (data indicating the place where indoor transmitter 200 is mounted) to be transmitted from indoor transmitter 200, or to support a different communication method by changing firmware even after indoor transmitter 200 is mounted on the ceiling of the building or the like.

It is noted that access to indoor transmitter 200 via wireless I/F 210 is preferably protected by an ID and a password. This prevents a third party other than an administrator of indoor transmitter 200 from altering data or a program.

Although the wireless interface is assumed in the present embodiment, a wired interface is also possible, if it is advantageous considering time and effort of wiring and installation on an intended installation place.

Further, communication can be implemented by means of, but not limited to, a public network, a LAN (Local Area Network), a USB (Universal Serial Bus) serial transfer, and the like.

[Digital Processing Block]

Digital processing block 240 includes: a processor 241 for controlling an operation of indoor transmitter 200 in response to a command from wireless I/F 210 or in accordance with a program; an RAM (Random Access Memory) 242 mounted on processor 241 for storing a program executed by processor 241; an EEPROM (Electronically Erasable and Programmable Read-Only Memory) 243 for storing the setting parameters and the like among data from wireless I/F 210; a field programmable gate array (hereinafter, referred to as "FPGA") 245 for generating a baseband signal to be transmitted from indoor transmitter 200 under the control of processor 241; an EEPROM 244 for storing firmware of FPGA 245 among the data from wireless I/F 210; and a digital/analog converter (hereinafter, referred to as "D/A converter") 247 for changing the baseband signal output from FPGA 245 to an analog signal and applying the signal to analog processing block 250.

Specifically, digital processing block 240 generates data as the source of signals to be transmitted by indoor transmitter 200 as the positioning signals. Digital processing block 240 sends the generated data as a bit stream, to analog processing block 250.

Though not specifically limited, the firmware program stored in EEPROM 244 is loaded to FPGA 245 when FPGA 245 is powered-on, for example. The firmware program information (bit stream data) is loaded to a configuration memory implemented by an SRAM (Static Random Access Memory) 246 in FPGA 245. Individual bit data of the loaded bit stream data will be the information source of a circuit realized on FPGA 245, and customizes resources provided in FPGA 245 to realize a circuit specified by the firmware program. Since FPGA 245 is independent from hardware and configuration data is provided from the outside, high versatility and flexibility can be realized.

Further, in accordance with an external command received from wireless I/F 210, processor 241 stores the following as parameters set in indoor transmitter 200, in SRAM 246 (register) of FPGA 245, based on the data stored in EEPROM 243:

1) Pseudo Random Noise Code (PRN Code);
2) Transmitter ID;
3) Transmitter coordinates;
4) Message (shaped to the same format as a navigation message from a satellite, in FPGA 245);
5) Selection parameter for digital filter; and
6) URL (Uniform Resource Locator) of a web server that provides indoor map information (SVG map information) expressed with the SVG, in accordance with the installation location of indoor transmitter 200.

Here, such URL information may be stored only in an indoor transmitter installed around an entrance of a facility from outside, such as the building in which indoor transmitters 200 are installed.

More generally, the information for specifying the location of the SVG map information on the web server may be URI (Uniform Resource Identifier). Hereinafter, the URI is also simply referred to as "resource identification information". For simplicity of description, it is assumed below that this resource identification information is URL information.

In FPGA 245, for example, band pass filters for 1 MHz, 2 MHz, and 4 MHz (center frequency: 1575.42 MHz) are programmed in advance as described later. The "selection parameter for digital filter" refers to a parameter for selection of one of the band pass filters.

The program for the operation of processor 241 is also stored in advance in EEPROM 243, and when indoor transmitter 200 is activated, the program is read from EEPROM 243 and transferred to RAM 242.

The storage for storing the program or data is not limited to EEPROM 243 or 244. A storage at least capable of storing data in non-volatile manner may be used. As will be described later, when data is received from the outside, any storage that allows data writing may be used. Data structure of the data stored in EEPROM 243 will be described later.

(Analog Processing Block)

Analog processing block 250 performs modulation to carrier wave of 1.57542 GHz using a bit stream output from digital processing block 240 to generate a transmission signal, and outputs it to antenna 292. The signal is emitted from the antenna.

Specifically, the signal output from D/A converter 247 of digital processing block 240 are up-converted by an up-converter 252, passed through a band-pass filter (BPF) 253 and an amplifier 254 to have only the signal of prescribed frequency band amplified, again up-converted by up-converters 255, and a signal of a prescribed band is taken by a SAW (Surface Acoustic Wave) filter. Then, the resulting signal is converted by a variable attenuator 257 and an RF switch 258 into a signal having set intensity and is emitted from the antenna.

It is noted that a manner of generation of the signal is not limited to the above. For example, although the modulation is performed in two stages in the above-described example, modulation in one stage may be employed. Alternatively, signal conversion may be performed directly.

The clock used in up-converter 252 and up-converter 255 is a clock supplied from reference clock I/O block 230 to FPGA 245 and doubled by a doubler 251.

Further, setting of levels of variable attenuator 257 and RF switch 258 is controlled by a control signal from processor 241 through FPGA 245. Variable attenuator 257 changes the signal intensity. Both variable attenuator 257 and RF switch 258 operate as a part of the below-described "function of individually varying IQ modulation amplitude".

Figure 8:
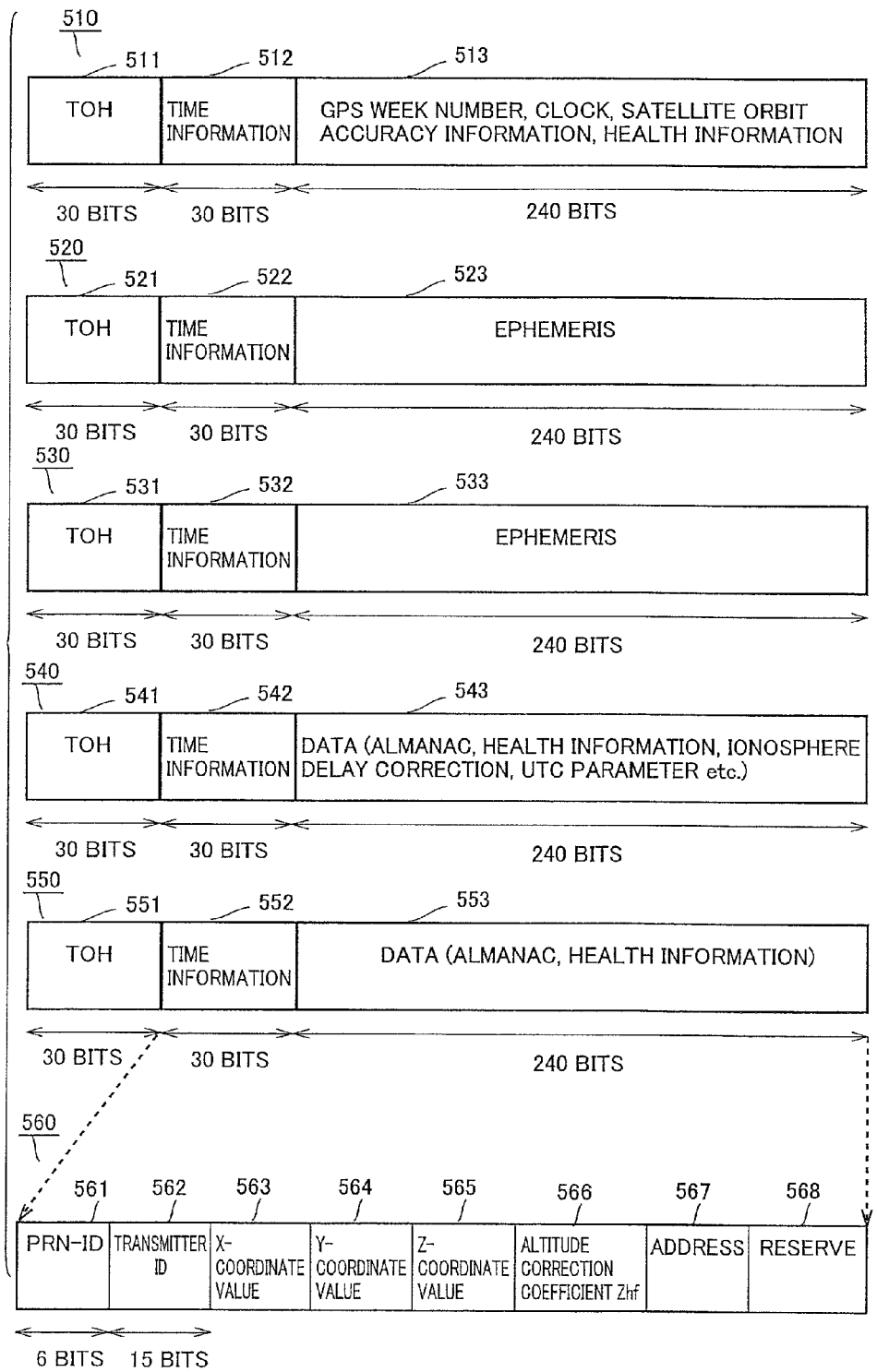
FIG. 8 shows a configuration of a signal 500 emitted from a transmitter mounted on a GPS satellite.

In this manner, a signal having the same configuration (the same signal format) as that of the signal for positioning from the satellite is emitted from indoor transmitter 200. In this case, the contents of the signal are not exactly the same as those of the positioning signal emitted from the satellite, but it can be said that for the receiver, both the signals are compatible with each other. An example of the configuration of signal emitted from indoor transmitter 200 will be described later (FIG. 8).

Though FPGA 245 is used as an arithmetic processing device for realizing the digital signal processing in digital processing block 240 in the foregoing description, other arithmetic processing device may be used, provided that it can change the modulation function of the wireless device by software.

Further, though a clock signal (Clk) is supplied from digital processing block 240 to analog processing block 250 in FIG. 2, it may be directly supplied from reference clock I/O block 230 to analog processing block 250.

For clearer description, in the present embodiment, digital processing block 240 and analog processing block 250 are shown separately. Physically, these blocks may be mounted together on one chip.

(Reference Clock I/O Block)

Reference clock I/O block 230 supplies a clock signal for defining the operation of digital processing block 240, or a clock signal for generating carrier wave, to digital processing block 240.

In an "external synchronization mode", reference clock I/O block 230 supplies, through a driver 234, a clock signal to digital processing block 240 and the like, based on a synchronization signal applied from an external clock generator to an external synchronization link port 220. An operation in this "external synchronization mode" will be described later more in detail.

In an "external clock mode", reference clock I/O block 230 selects an external clock signal applied to an external clock port 221 by a multiplexer 232, synchronization between the external clock and a clock signal output from a PLL (Phase Locked Loop) circuit 233 is established, and the synchronized clock signal is supplied to digital processing block 240 and the like.

On the other hand, in an "internal clock mode", reference clock I/O block 230 selects an internal clock signal generated by an internal clock generator 231 by multiplexer 232, synchronization between the internal clock and the clock signal output from PLL circuit 233 is established, and the synchronized clock signal is supplied to digital processing block 240 and the like.

It is noted that by the signal output from processor 241 through wireless I/F 210, internal state (for example, "PLL control signal") of the transmitter can be monitored. Alternatively, wireless I/F 210 can receive the code pattern of the pseudo random noise code for spread modulation of the signal to be emitted from indoor transmitter 200, or wireless I/F 210 can receive other data to be emitted from indoor transmitter 200. The other data is, for example, text data (location data) representing the place where indoor transmitter 200 is installed. If indoor transmitter 200 is installed in a commercial facility such as a department store, advertisement data can be input to indoor transmitter 200 as the above-described other data.

When input to indoor transmitter 200, the code pattern of the pseudo random noise code (PRN code) is written in a predefined area of EEPROM 243. Thereafter, the written PRN-ID is included in the signal for positioning. Other data are also written to areas ensured in advance in accordance with the data type, in EEPROM 243.

[Data Structure of Data Stored in EEPROM 243]

Figure 3:
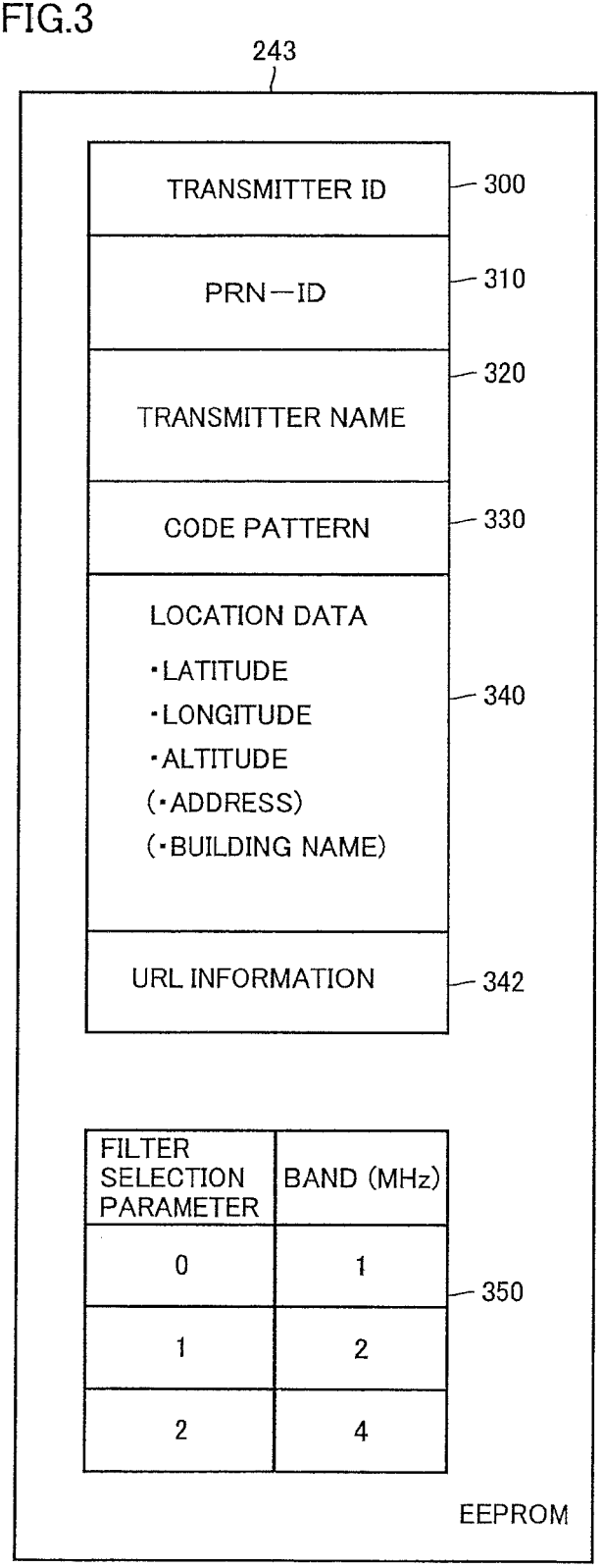
FIG. 3 schematically shows a manner of data storage in an EEPROM 243 provided in indoor transmitter 200.

Referring to FIG. 3, data structure of data stored in EEPROM 243 of indoor transmitter 200 will be described.

FIG. 3 schematically shows a manner of data storage in EEPROM 243 provided in indoor transmitter 200. EEPROM 243 includes areas 300 to 350 for storing data.

Area 300 stores a transmitter ID, as a number for identifying the transmitter. The transmitter ID is, for example, numerals and/or alphabets or other combination written in a non-volatile manner in the memory, when the transmitter is manufactured or installed. Alternatively, in another aspect, the transmitter ID is associated with the installation location (geographical location information, address, or other human-defined location information) of the transmitter as a unique ID.

The PRN-ID of the pseudo random noise code allotted to the transmitter is stored in area 310. The name of the transmitter is stored as text data in area 320.

The code pattern of the pseudo random noise code allotted to the transmitter is stored in area 330. The code pattern of the pseudo random noise code is selected from a plurality of finite number of code patterns allotted beforehand to the location information providing system according to the embodiment of the present invention and belonging to the same type of pseudo random noise codes for satellites. The code pattern thereof is different from the code pattern of the pseudo random noise code allotted to each satellite.

The code patterns of the pseudo random noise codes allotted to the present location information providing system are finite in number. The number of indoor transmitters is different dependent on the size of the installation location of each transmitter or the structure of the installation location (for example, the number of floors in a building). A plurality of indoor transmitters larger in number than the number of code patterns may possibly be used. Therefore, there may be a plurality of transmitters having the same code pattern of the pseudo random noise code. In that case, the installation locations of the transmitters having the same code pattern may be determined in consideration of signal output. This prevents simultaneous reception of a plurality of positioning signals using the same code pattern of the pseudo random noise code by the same location information providing apparatus.

Location data for specifying the location where indoor transmitter 200 is installed is stored in area 340. The location data is represented, by way of example, as a combination of latitude, longitude, and altitude. In area 340, in addition to or in place of the location data, an address, a name of building, or the like may be stored. In the present invention, the data that can by itself identify location where indoor transmitter 200 is installed, such as "combination of latitude, longitude, and altitude", "identifier", " address and name of the building" or "combination of latitude, longitude, and altitude, identifier, and address and name of the building" will be generally referred to as "location specifying data."

Further, the URL information of the web server (information providing server) for providing the SVG map information is stored in area 342 as described later in detail.

Further, in area 350, the filter selection parameters for selection of the filters are stored. Although the filter selection parameters are not particularly limited, it is assumed that "1 MHz", "2 MHz", and "4 MHz" are selected as the bandwidths of the band pass filter so as to correspond to the filter selection parameters "0", "1", and "2", respectively, for example.

Here, as described above, the PRN-ID, the name of the transmitter, the code pattern of the pseudo random noise code, the location specifying data, the URL information, and the filter selection parameters can be changed to other data input through wireless interface 210.

[Configuration of FPGA 245]

In the following, a circuit realized by FPGA 245 shown in FIG. 2 will be described.

Figure 4:
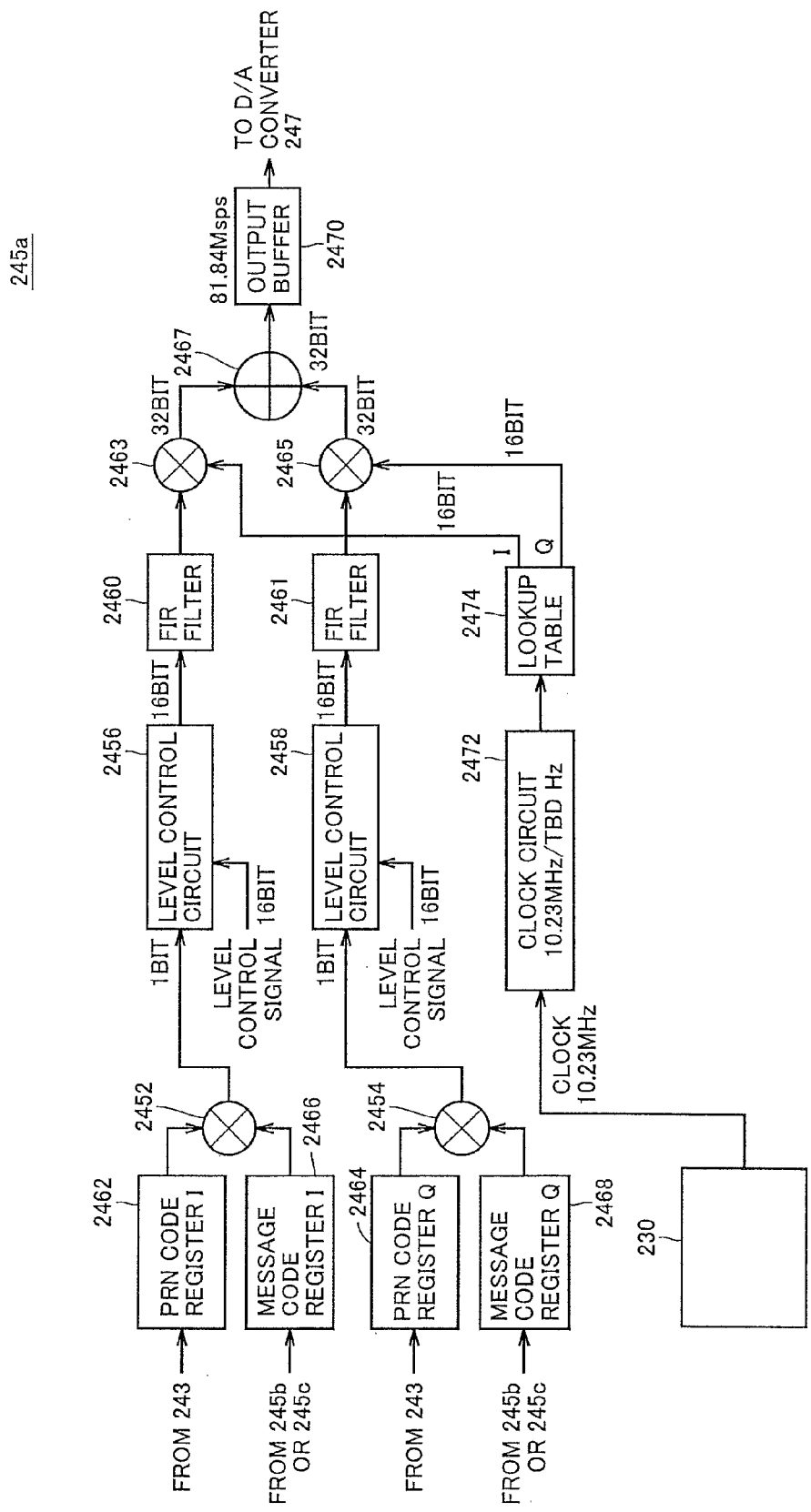
FIG. 4 is a function block diagram for illustrating a configuration of a modulator 245a of circuits implemented by an FPGA 245, modulator 245a performing modulation onto a baseband signal of C/A (Coarse and Acquisition) code or a baseband signal of L1C code in accordance with a signal format thereof, the baseband signal of C/A code being a signal for positioning and to be carried by an L1 band (1575.42 MHz) of a carrier wave of a current GPS signal, the baseband signal of L1C code being a signal for positioning and to be used in an L1 band of a new positioning satellite system (such as the quasi-zenith satellite system of Japan).

First, FIG. 4 is a function block diagram for illustrating a configuration of a modulator 245a of the circuits implemented by FPGA 245. Modulator 245a performs modulation onto a baseband signal of C/A (Coarse and Acquisition) code or a baseband signal of L1C code in accordance with a signal format thereof. The baseband signal of C/A code is a signal for positioning and to be carried by the L1 band (1575.42 MHz) of the carrier wave of the current GPS signal. The baseband signal of L1C code is a signal for positioning and to be used in the L1 band of a new positioning satellite system (such as the quasi-zenith satellite system of Japan).

Here, for example, assume that BPSK (Binary Phase Shift Keying) modulation is done for the C/A code and that QPSK (Quadrature Phase Shift Keying) modulation is done for the L1C code. As will be made clear in the following description, the method of modulation for converting a digital value to an analog signal is not limited to the BPSK modulation or the QPSK modulation, and any other method that can be realized by FPGA 245 may be used.

Here, the configuration shown in FIG. 4 is basically the configuration of a QPSK modulator, but is a circuit configuration capable of implementing both the BPSK modulation and the QPSK modulation by adapting the same signal to be carried by the I phase and the Q phase to attain modulation equivalent to the BPSK modulation. It is noted, however, that in accordance with modulating methods realized by modulator 245*a*, circuits independent for respective methods may be programmed.

Referring to FIG. 4, modulator 245*a* includes: PRN code registers 2462 and 2464 for receiving and storing PRN codes stored in EEPROM 243; and message code registers 2466 and 2468 for receiving and storing message data that is in accordance with a signal format of C/A code or L1C code from a message data generating device 245*b* or a message data generating device 245*c* described later.

Here, in PRN code registers 2462 and 2464, PRN codes set in EEPROM 243 from the outside are input. In the case of the BPSK modulation, the same data is stored in message code registers 2466, 2468 and the same data is stored in PRN code registers 2462, 2464 as described above. On the other hand, in the case of the QPSK modulation, different data for the I phase and the Q phase are stored in message code registers 2466, 2468 and different data for the I phase and the Q phase are stored in PRN code registers 2462, 2464.

Modulator 245*a* further includes: a multiplier 2452 for multiplying time-series data read from PRN code register 2462 by time-series data read from message code register 2466; a multiplier 2454 for multiplying time-series data read from PRN code register 2464 by time-series data read from message code register 2468; a level control circuit 2456 controlled in accordance with a level control signal LVC1 from processor 241 to change the intensity of the signal received from multiplier 2452; a level control circuit 2458 controlled in accordance with a level control signal LVC2 from processor 241 to change the intensity of the signal received from multiplier 2454; an FIR filter 2460 functioning as a band pass filter for the output from level control circuit 2456 in a bandwidth selected by the filter selection parameter; and an FIR filter 2461 functioning as a band pass filter for the output from level control circuit 2458 in a bandwidth selected by the filter selection parameter.

Modulator 245*a* further includes: a clock circuit 2472 for generating a modulation reference clock in accordance with a signal format based on the clock signal from reference clock I/O block 230; a look-up table 2474 for outputting data corresponding to preset sine wave and cosine wave as the I phase modulation signal and the Q phase modulation signal respectively in synchronization with the signal from clock circuit 2472; a multiplier 2463 for multiplying a signal corresponding to the sine wave output from look-up table 2574 by a signal from FIR filter 2460; a multiplier 2465 for multiplying a signal corresponding to the cosine wave output from look-up table 2574 by a signal from FIR filter 2461; an adder 2467 for adding the signals from multipliers 2463 and 2465; and an output buffer 2470 for buffering the output from adder 2467 and outputting it to D/A converter 247.

The following describes data included in the signal thus output from modulator 245*a* to D/A converter 247.

[In the Case of Outputting Signal Compatible with Current GPS Signal]

In the case where the firmware of FPGA 245 is adapted to employ a circuit configuration of outputting a signal compatible with the current GPS signal (signal compatible with L1 C/A code: L1 C/A compatible signal), modulator 245*a* modulates the information of "latitude, longitude, and altitude" of the transmitter as a message in each of the Q phase signal and the I phase signal, and thereby generates a BPSK modulated signal. Here, the "compatible signal" means a signal that has a common signal format and hence receivable by a common front end by the receiver.

[In the Case of Outputting Signal Compatible with L1C Signal: L1C Compatible Signal]

The following describes a case where the firmware of FPGA 245 is adapted to employ a circuit configuration of outputting a signal compatible with the L1C signal.

First, as a premise, an L1C signal from a satellite will be described briefly.

The L1C signal from the satellite is QPSK-modulated as described above. The Q phase signal carries a modulated pilot signal for acquisition of the receiver. The Q phase signal is higher in level by 3 dB than the I phase signal. On the other hand, the I phase signal carries a navigation message or the like.

Here, the pilot signal for acquisition is carried by the Q phase signal due to the following reason.

That is, the C/A code of the current GPS signal is a signal of 1,023 chips and has a period of 1 msec. For 20 periods, the same signal continues. Hence, S/N can be increased by integration. On the other hand, the L1C signal is of 10,230 chips and has a period of 10 msec. Hence, the same signal continues for only one period. Accordingly, S/N cannot be increased by integration. Hence, the Q phase signal of the signal from the satellite needs to be used for acquisition.

On the other hand, the Q phase signal of the signal compatible with L1C signal and sent from indoor transmitter 200 can carry the transmitter ID. This is because the intensity of the signal emitted by indoor transmitter 200 is stronger than that of the signal from the GPS satellite and therefore the signal for acquisition is unnecessary. This is based on a fact that the signal from the GPS satellite requires the signal for acquisition because it becomes weak when propagated to the ground whereas the intensity of the signal from the indoor transmitter needs to be increased to prevent multipathing or unstable propagation. Meanwhile, the I phase signal carries the location specifying data, such as the data of latitude, longitude, and altitude.

Figure 5:
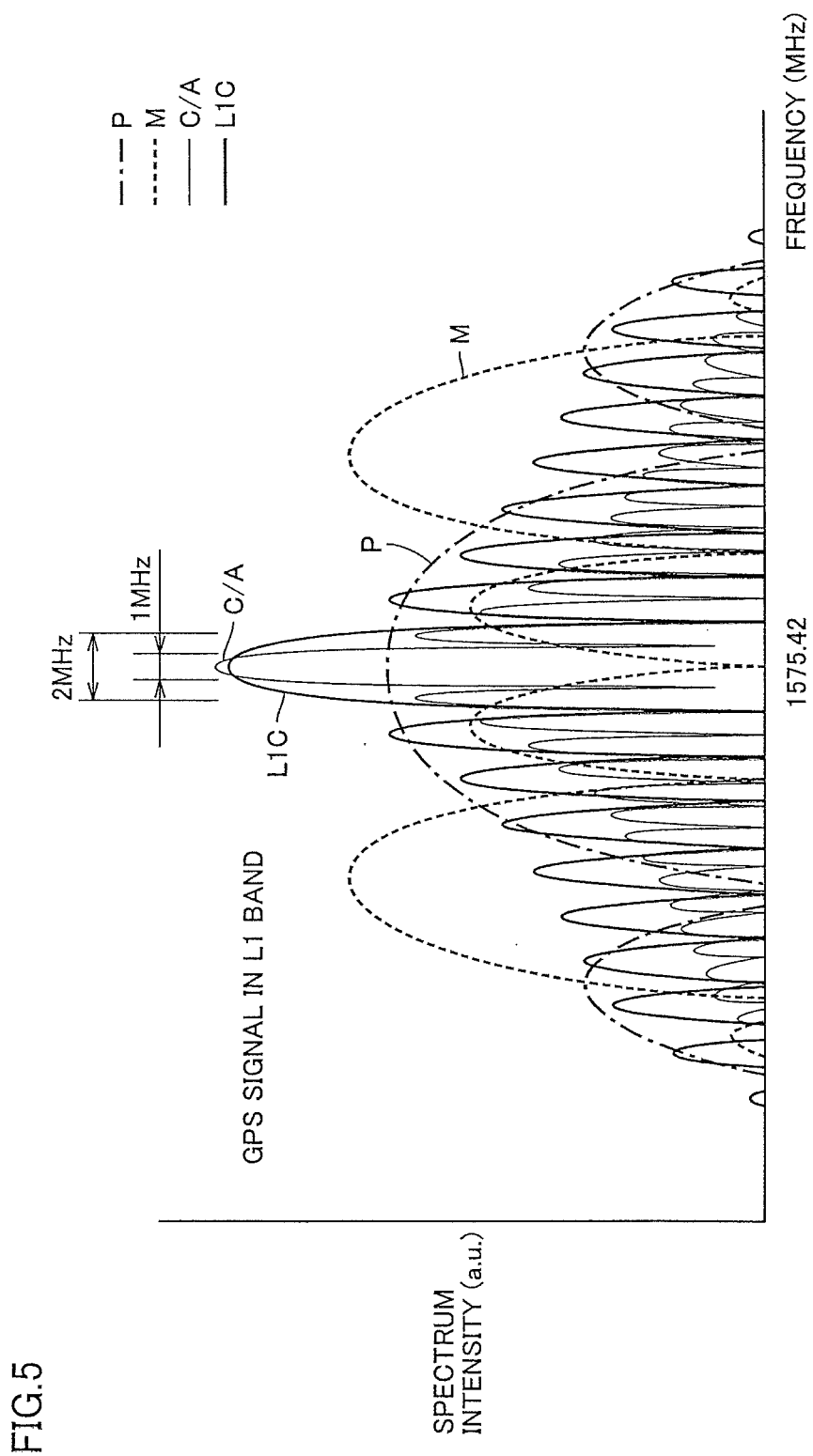
FIG. 5 shows spectrum intensity distributions of the signal of L1 C/A code and the signal of L1C code.

FIG. 5 shows spectrum intensity distributions of the signal of the L1 C/A code and the signal of the L1C code. It is noted that FIG. 5 also shows spectrum intensities of signals of a P code and an M code. The signal of the P code is transmitted from the satellite in the L1 band for military purpose together with the C/A code. The signal of the M code is transmitted from the satellite together with the L1C signal mainly for military purpose.

As shown in FIG. 5, the C/A code has a main peak having a center frequency of 1575.42 MHz and has side lobe signals around it. On the other hand, the L1C code has a null point at the center frequency of 1575.42 MHz in order to suppress interference with the C/A code, has two main peaks at both sides relative to the null point, and has side lobe signals outside the main peaks.

Hence, for the C/A code, only the main peak can be extracted by the band pass filter having a bandwidth of 1 MHz. For the L1C code, only the main peaks can be extracted by the band pass filter having a bandwidth of 2 MHz.

As described above, the signal transmitted from indoor transmitter 200 has a stronger intensity in a geographical point in which the signal is received, than the intensity of the signal transmitted from the GPS satellite and received on the ground. Hence, only an intended frequency component can be transmitted, thereby suppressing interference with other signals.

[Message Data Generating Device 245b]

Figure 6:
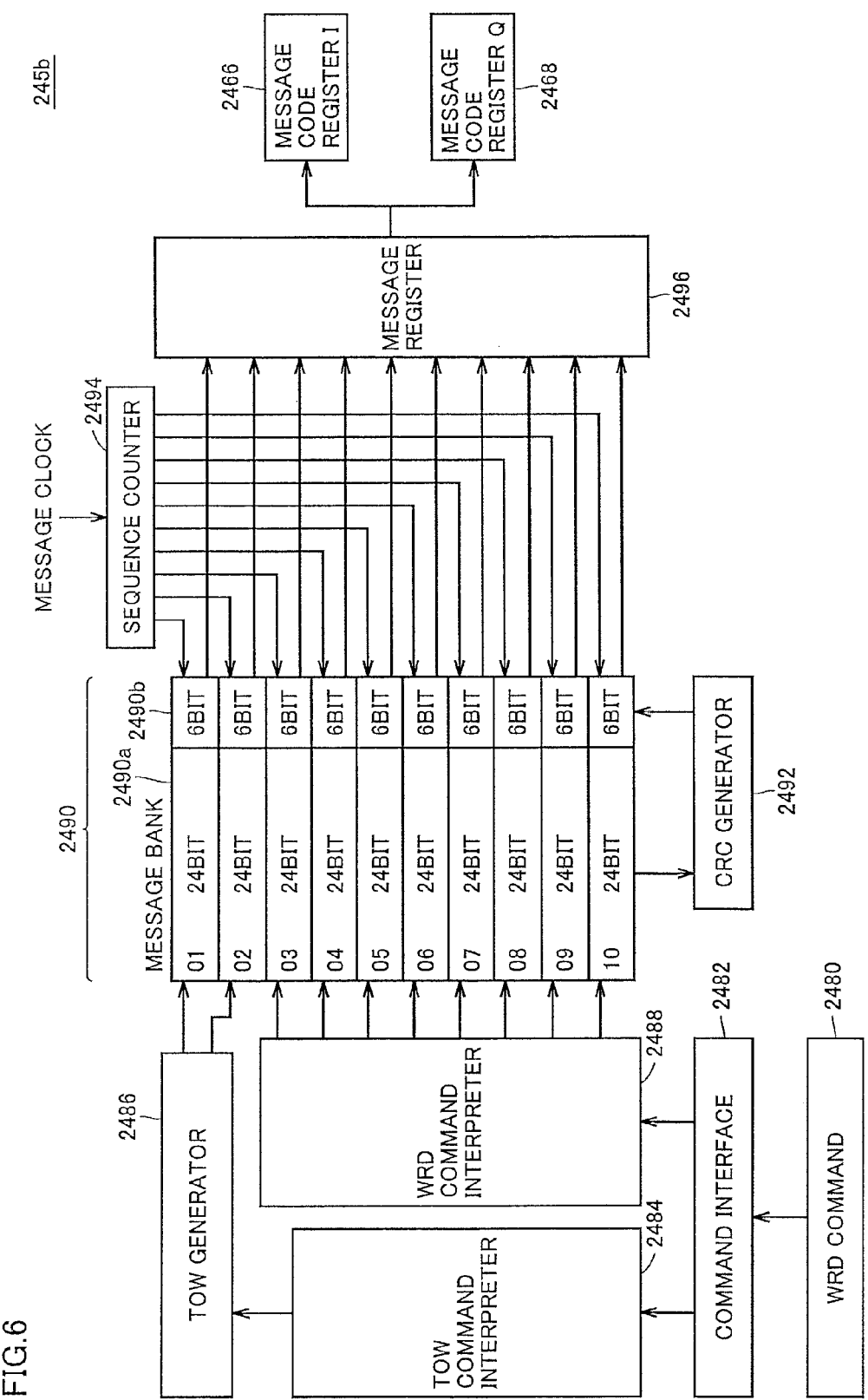
FIG. 6 is a function block diagram showing a configuration of a message data generating device 245b when setting firmware of FPGA 245 to transmit a signal compatible with the C/A code in the L1 band.

FIG. 6 is a function block diagram showing the configuration of message data generating device 245b when setting the firmware of FPGA 245 to transmit the signal compatible with the C/A code in the L1 band.

As described below, message data generating device 245b performs a process that allows the externally provided location specifying data or the like to be carried by a portion corresponding to the navigation message in the C/A code in the L1 band in accordance with the signal format.

Message data generating device 245b includes: a command interface 2482 for receiving a command 2480 from processor 241; a TOW command interpreter 2484 for reading information of TOW (Time Of Week) in the C/A code in the L1 band based on the command supplied from command interface 2482; a command interpreter 2488 for reading the content of a command other than the TOW command; a TOW generator 2486 for generating the TOW information based on the signal from TOW command interpreter 2484; and a message bank 2490 for receiving and storing the TOW information sent from TOW generator 2486 and the message information sent from command interpreter 2488.

Message bank 2490 includes: banks 01 and 02 each having a capacity of 30 bits to store the TOW information therein; and banks 03 to 10 each having a capacity of 30 bits to store the message information therein. Each of banks 01 to 10 has an area 2490a for storing 24 bits of information. From the 24 bits of data, CRC generator 2492 generates a CRC code (6 bits) for error detection, and stores it in an area 2490b subsequent to area 2490a of each bank.

A sequence counter 2494 sequentially feeds read signals to banks 01 to 10 in synchronization with a message clock (MSG Clock) that is based on the clock from reference clock I/O block 230. In response to this, data is read from each of banks 01 to 10 and is stored in message register 2496.

Data of message register 2496 is written in both message code registers 2466 and 2468. The process thereafter is as described as the operation of modulator 245a in FIG. 4.

[Message Data Generating Device 245c]

Figure 7:
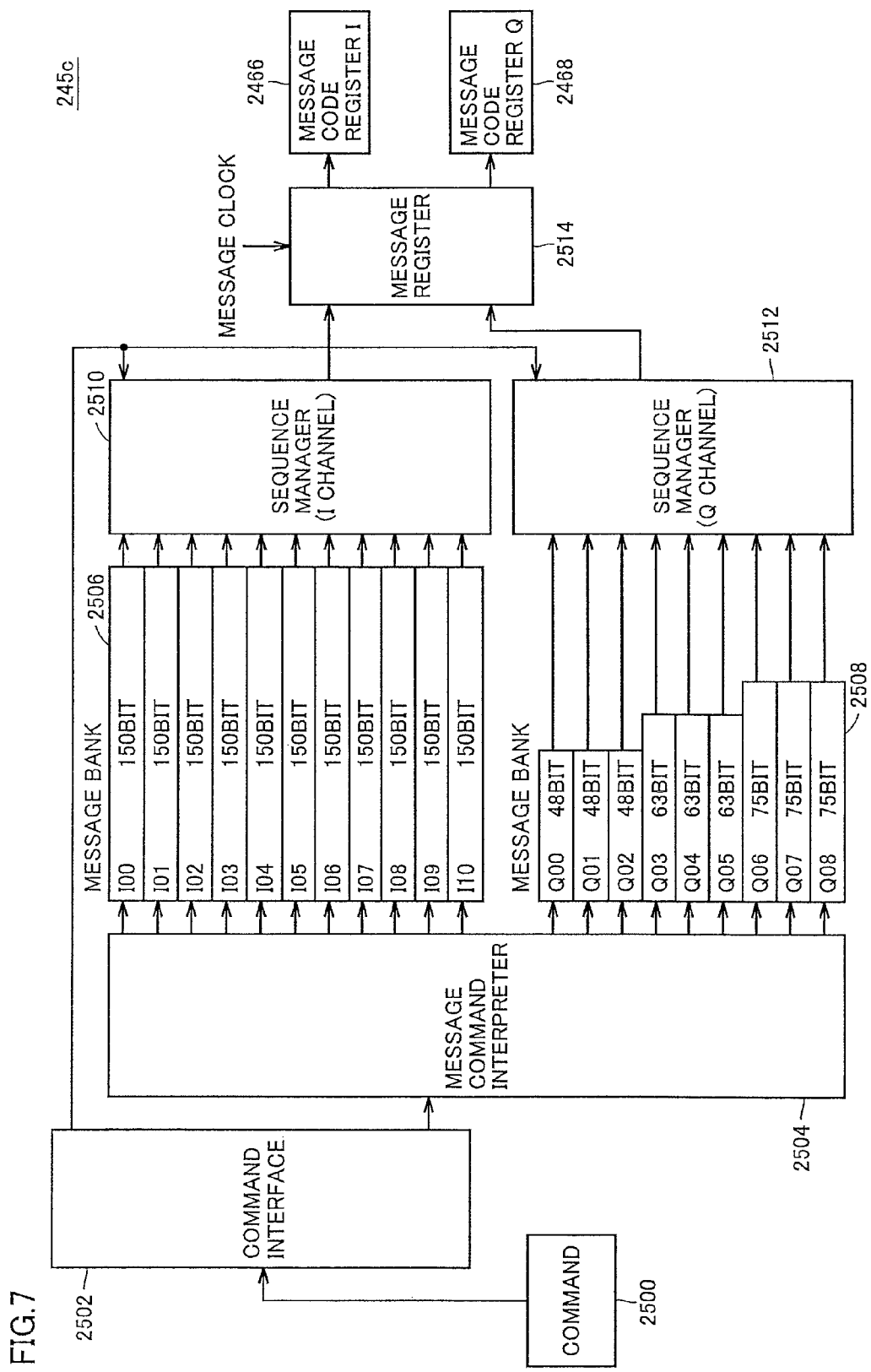
FIG. 7 is a function block diagram showing a configuration of a message data generating device 245c when setting the firmware of FPGA 245 to transmit a signal compatible with the L1C code.

FIG. 7 is a function block diagram showing a configuration of message data generating device 245c when setting the firmware of FPGA 245 to transmit the signal compatible with the L1C code.

As described below, message data generating device 245c performs a process that allows the externally provided location specifying data, transmitter ID, or the like to be carried by a portion corresponding to the navigation message and the pilot signal in the L1C code, in accordance with the signal format.

Message data generating device 245c includes: a command interface 2502 for receiving a command 2500 from processor 241; a message command interpreter 2504 for interpreting content of data to be transmitted as a message, based on a command received from command interface 2502; a message bank 2506 for receiving and storing I phase message information from message command interpreter 2504; and a message bank 2508 for receiving and storing Q phase message information from message command interpreter 2504.

Message bank 2506 includes banks I00 to I10 each having a capacity of 150 bits to store the I phase information therein. Message bank 2508 includes: banks Q00 to Q02 each having a capacity of 48 bits to store the Q phase information therein; banks Q03 to Q05 each having a capacity of 63 bits to store the Q phase information therein; banks Q06 to Q08 each having a capacity of 75 bits to store the Q phase information therein. It is noted that the capacities of the banks for the Q phase are not limited to these values. For example, each of the capacities of banks Q00 to Q08 can be 150 bits as with the capacity of each of the banks for the I phase.

Here, the transmitter ID is stored in message bank 2508 for the Q phase, for example. On the other hand, message bank 2506 for the I phase can store not only the above-described "location specifying data" but also, for example, "data for advertisement and promotion", "traffic information", "weather information", and "disaster information" received via wireless I/F 210 from the outside of indoor transmitter 200. The disaster information includes, for example, earthquake prediction, earthquake occurrence information, and the like. Here, the term "outside" includes a server apparatus or the like, which are operated by business operators, public offices, and the like for providing the above-described information. These information may be transmitted in real time from the external server apparatus, or may be regularly updated. Alternatively, the information may be updated at any time by an operator/administrator of indoor transmitter 200. For example, in the case where each indoor transmitter 200 is installed in a department store, data for advertisement and promotion may be provided to indoor transmitter 200 by the operator/administrator as one business activity of the department store.

Although not particularly limited, the data stored in banks Q00 to Q08 can be configured to be provided with BCH error correcting codes, and the data stored in banks I00 to I10 can be configured to be provided with error detecting codes. Accordingly, for the data of banks Q00 to Q08 repetitively including the transmitter ID having a short data length, correct data can be obtained whenever received in this short period. Accordingly, the reception data can be confirmed at an early stage. In this way, reception data for the Q phase side can be confirmed earlier than reception data for the I phase side and transition can be made to a below-described process of obtaining the location information (query to the server).

Message data generating device 245c further includes: a sequence manager 2510 for reading, from each of banks I00 to I10, data to be included in the I phase signal in a sequence according to the command from command interface 2502; and a sequence manager 2512 for reading, from each of banks Q00 to Q08, data to be included in the Q phase signal in a sequence according to the command from command interface 2502.

Message data generating device 245c further includes a message register 2514 for sequentially reading data from sequence manager 2510 and sequence manager 2512 in synchronization with the message clock (MSG Clock) that is based on the clock from reference clock I/O block 230, and for separately writing them in message code registers 2466 and 2468.

Data of message register 2514 is written in both message code registers 2466 and 2468. The process thereafter is as described as the operation of modulator 245a in FIG. 4.

In the case where indoor transmitter 200 transmits the signal generated by message data generating device 245c, it is assumed that the receiver (location information providing apparatus) is also provided with storage areas sectioned to I00 to I10 so as to respectively correspond to message banks I00 to I10 each provided for the I phase in the transmitter and each having 150 bits, and is also provided with storage areas sectioned to Q00 to Q08 so as to respectively correspond to message banks Q00 to Q08 for the Q phase. In this way, whenever any of data stored in banks I00 to I10 or banks Q00 to Q08 is newly received, the content in the corresponding storage area in the receiver is updated. To attain this, it is assumed that the data stored in each of banks I00 to I10 and Q00 to Q08 includes an identifier that can identify from which bank the data comes.

Now, the following describes a summary about the signal generated by message data generating device 245c, with regard to the message transmitted from indoor transmitter 200. It is noted that the signal generated by message data generating device 245c is referred to as "L1C compatible message".

The L1C compatible message is formed of the I phase signal and the Q phase signal. In the I phase signal and the Q phase signal, independent and different messages are modulated. Specifically, in the Q phase signal, short information such as the transmitter ID is modulated, for example. The Q phase signal has a data length shorter than that of the I phase signal. Hence, the receiver can acquire the Q phase signal quickly and therefore obtain the ID immediately. However, this ID itself does not have meaning (for example, location information). Hence, only from the transmitter ID, the receiver cannot find its location. Hence, for example, via a mobile phone network, the receiver accesses to a site of a server apparatus that provides location information, and transmits the transmitter ID to the server apparatus so as to obtain, from the server apparatus, location information associated with the transmitter ID.

Meanwhile, in the I phase signal, the location specifying data is modulated. In a certain aspect, the message included in the I phase signal can be configured to be variable. For example, apart from the location information, variable messages such as traffic information, weather information, and disaster information can be modulated in the I phase signal. In this way, when indoor transmitter 200 is brought into connection with an external network, the variable messages can be updated in real time to provide the user of the receiver with appropriate information. The I phase signal includes the location information itself. Hence, the user of the receiver can know his/her location without connecting the receiver to the network. Hence, for example, when a disaster takes place and communication lines are congested, the location of the receiver can be specified as long as the L1C compatible message can be received. In this case, when the receiver can serve as a mobile phone to send its location, a person who receives the signal can be facilitated in specifying the location of the person who sent the signal (i.e., disaster victim).

In this way, the I phase signal and the Q phase signal are different from each other in terms of the information itself to be modulated as well as the configuration such as the length of each signal. In order to obtain the location information, the receiver needs to receive at least one of the signals. Hence, the user of the receiver can make a selection, as required, as to whether to receive the I phase signal or the Q phase signal. This selection is implemented by the user providing the receiver with a setting as to which one of the signals is to be received. Alternatively, the receiver may be configured to automatically switch from an I phase signal receiving mode to a Q phase signal receiving mode when connection to a server via a communication line has failed due to timeout caused by communication line congestion.

It is noted that the C/A signal includes the PRN-ID and the message (for example, the location information). Further, the message can be also updated in real time. Hence, the newest message can be included in the C/A signal.

[Data Structure of Signal Transmitted from Indoor Transmitter 200]

First, a structure of the signal compatible with L1 band C/A code carrying the message generated by message data generator 245b will be described.

[L1 C/A Compatible Signal]

Referring to FIG. 8, the positioning signal transmitted from the transmitter will be described. FIG. 8 shows a configuration of a signal 500 emitted by a transmitter mounted on a GPS satellite. Signal 500 is formed of five sub frames each having 300 bits, that is, sub frames 510 to 550. Sub frames 510 to 550 are repeatedly transmitted by the transmitter. Sub frames 510 to 550 each include 300 bits, and are transmitted at a bit rate of 50 bps (bit per second), for example. Therefore, in this case, each sub frame is transmitted in 6 seconds.

First sub frame 510 includes a TOH 511 of 30 bits, time information 512 of 30 bits, and message data 513 of 240 bits. Time information 512 specifically includes time information obtained when sub frame 510 is generated, and a sub frame ID. Here, the sub frame ID represents an identification number for distinguishing first sub frame 510 from other sub frames. Message data 153 includes GPS week number, clock information, health information of the GPS satellite, and orbit accuracy information.

Second sub frame 520 includes a TOH 521 of 30 bits, time information 522 of 30 bits, and message data 523 of 240 bits. Time information 522 has the same configuration as time information 512 of first sub frame 510. Message data 523 includes ephemeris (broadcast ephemeris). Here, the ephemeris represents orbit information of the satellite emitting the positioning signal. The ephemeris is highly precise information updated successively by a control station overseeing the satellite navigation.

Third sub frame 530 has the same configuration as that of second sub frame 520. Specifically, third sub frame 530 includes a TOH 531 of 30 bits, time information 532 of 30 bits, and message data 533 of 240 bits. Time information 532 has the same configuration as that of time information 512 of first sub frame 510. Message data 533 includes ephemeris.

Fourth sub frame 540 includes a TOH 541 of 30 bits, time information 542 of 30 bits, and message data 543 of 240 bits. Different from other message data 513, 523 and 533, message data 543 includes almanac information, summary of satellite health information, ionospheric delay information, UTC (Coordinated Universal Time) parameter and the like.

Fifth sub frame 550 includes a TOH 551 of 30 bits, time information 552 of 30 bits, and message data 553 of 240 bits. Message data 553 includes almanac information and the summary of satellite health information. Message data 543 and 553 each consist of 25 pages, and on each page, the different pieces of information described above are defined. Here, the almanac information represents schematic orbits of satellites and, it includes information not only of the corresponding satellite but also that of all the GPS satellites. When transmission of sub frames 510 to 550 is repeated 25 times, the process returns to the first page, and emission of the same pieces of information restarts.

Sub frames 510 to 550 are transmitted from each of transmitters 120, 121 and 122. When sub frames 510 to 550 are received by location information providing apparatus 100, the location of location information providing apparatus 100 is calculated based on each piece of maintenance/ management information included in TOH 511 to 551, time information 512 to 552 and message data 513 to 553.

A signal 560 has the same data length as each of message data 513 to 553 included in sub frames 510 to 550. Signal 560 is different from sub frames 510 to 550 in that in place of the orbit information represented as ephemeris (message data 523, 533), it has data representing the location of emission source of signal 560.

Specifically, signal 560 includes a PRN-ID 561 of 6 bits, a transmitter ID 562 of 15 bits, an X-coordinate value 563, a Y-coordinate value 564, a Z-coordinate value 565, an altitude correction coefficient (Zhf) 566, an address 567, and a reserve area 568. Signal 560 is transmitted from indoor transmitters 200-1, 200-2 and 200-3, in place of message data 513 to 553 included in sub frames 510 to 550.

PRN-ID 561 is an identification number for code patterns of a group of pseudo noise codes allotted beforehand to transmitters (for example, indoor transmitters 200-1, 200-2, and 200-3), each of which is the emission source of signal 560. Though PRN-ID 561 is different from the identification number for code patterns of a group of pseudo noise codes allotted to the respective transmitters mounted on the GPS satellites, PRN-ID 561 is a number allotted to code patterns generated from the code sequence of the same type. When the location information providing apparatus obtains any of the code patterns of the pseudo noise codes allotted to the indoor transmitters, from the received signal 560, it becomes possible to specify whether the signal corresponds to sub frame 510 to 550 transmitted from a satellite, or signal 560 transmitted from an indoor transmitter.

X-coordinate value 563, Y-coordinate value 564, and Z-coordinate value 565 are data representing the location where indoor transmitter 200 is mounted. X-coordinate value 563, Y-coordinate value 564, and Z-coordinate value 565, by way of example, indicate latitude, longitude and altitude, respectively. Altitude correction coefficient 566 is used for correcting the altitude specified by Z-coordinate value 565. Altitude correcting coefficient 566 is not an essential data item. Therefore, if accuracy equal to or higher than the altitude specified by Z-coordinate value 565 is unnecessary, the coefficient may not be used. In that case, data indicative of, for example, "NULL" is stored in the area allotted for altitude correcting coefficient 566.

In reserve area 568, the "address and name of the building", "data for advertisement and promotion", "traffic information", "weather information", or "disaster information" (such as earthquake information) may be allotted.

[L1C Compatible Signal]

The following describes a structure of a signal compatible with L1C code carrying the message generated by message data generator 245*c*.

In the description below, a data structure of the I phase signal will be illustrated.

[First Configuration of I Phase Signal]

Figure 9:
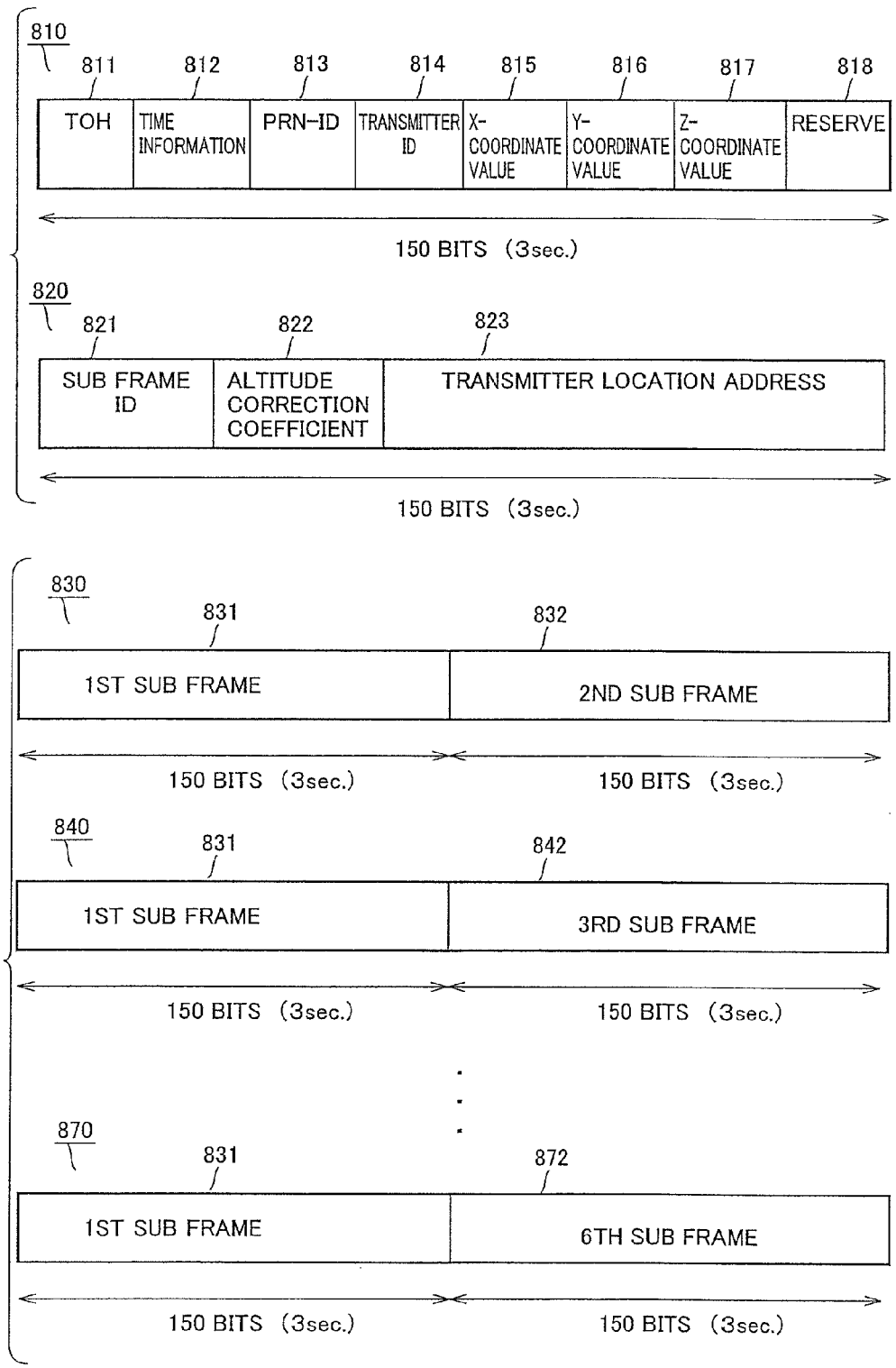
FIG. 9 shows a first configuration of an L1C compatible signal.

FIG. 9 shows a first configuration of the L1C compatible signal. In FIG. 9, six sub frames are transmitted. As the first sub frame, a signal 810 is transmitted by a transmitter. Signal 810 includes a TOH 811 of 30 bits, time information 812 of 30 bits, a PRN-ID 813 of 6 bits, a transmitter ID 814 of 15 bits, an X-coordinate value 815, a Y-coordinate value 816 and a Z-coordinate value 817. The first 60 bits of signal 810 are the same as the first 60 bits of each of sub frames 510 to 550 emitted by a GPS satellite.

In reserve area 818, the "address and name of the building", "data for advertisement and promotion", "traffic information", "weather information", or "disaster information" (such as earthquake information) may be allotted.

As the second sub frame, a signal 820 is transmitted by a transmitter. Signal 820 includes a sub frame ID 821 of 6 bits, an altitude correction coefficient 822, and a transmitter location address 823. By defining different pieces of information in 144 bits (in signal 820, altitude correction coefficient 822 and transmitter location address 823) following the sub frame ID of signal 820, the third to sixth sub frames are also transmitted in the similar manner. The pieces of information included in each sub frame are not limited to those described above. By way of example, advertisement related to the location information, URL (Uniform Resource Locators) of an Internet site and the like may be stored in areas defined beforehand in each sub frame.

Each of signals 830 to 870 represents an example of transmission of signals 810 and 820 described above and the third to sixth sub frames having the same structure as that of signal 820. Specifically, signal 830 has a first sub frame 831 and a second sub frame 832. First sub frame 831 has the same header as that of sub frames 510 to 550 transmitted from a GPS satellite. Second sub frame 832 corresponds to signal 820.

Signal 840 includes a first sub frame 831 and a third sub frame 842. First sub frame 831 is the same as first sub frame 831. The third sub frame has the same structure as that of signal 820.

Such a structure is repeated to signal 870 for transmitting sixth sub frame 872. Signal 870 includes first sub frame 831 and sixth sub frame 872.

Whenever the transmitter transmits each of signals 830 to 870 during repeated transmission of signals 830 to 870, first sub frame 831 is transmitted. After first sub frame 831 is transmitted, any of the other sub frames is interpolated. Specifically, the order of transmission of the respective frames is first sub frame 831→second sub frame 832→first sub frame 831→third sub frame 842→first sub frame→ . . . →sixth sub frame 872→first sub frame 831→second sub frame 832 . . . .

[Second Configuration of I Phase Signal]

Figure 10:
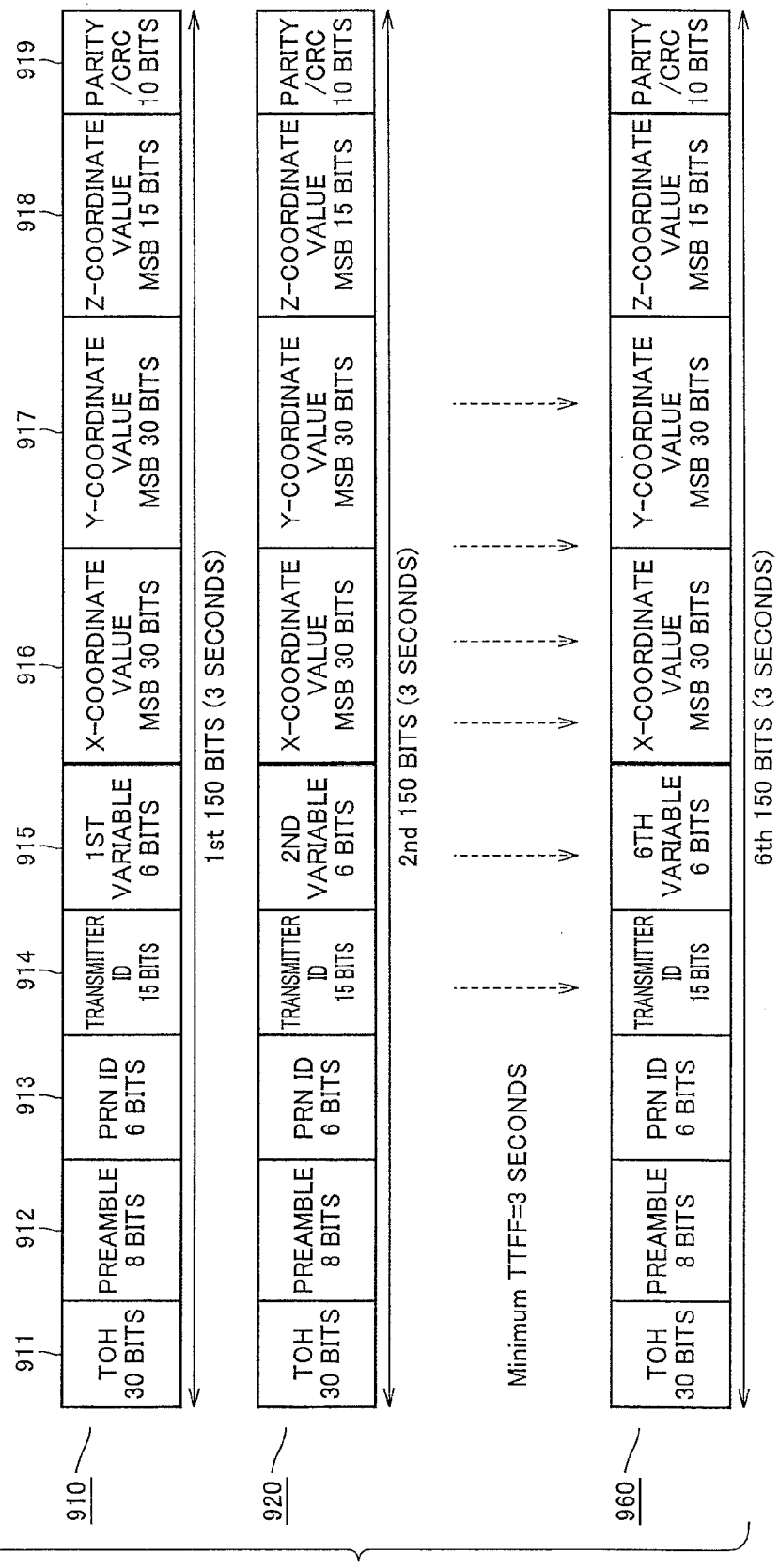
FIG. 10 shows a second configuration of the L1C compatible signal.

FIG. 10 shows a second configuration of the L1C compatible signal. The structure of the message data may be defined independent from sub frames 510 to 550.

FIG. 10 schematically shows the second configuration of L1C compatible signal 910. Referring to FIG. 10, L1C compatible signal 910 includes a TOH 911, a preamble 912, a PRN-ID 913, a transmitter ID 914, a first variable 915, an X-coordinate value 916, a Y-coordinate value 917, a Z-coordinate value 918, and a parity/CRC 919. A signal 920 has a configuration similar to that of L1C compatible signal 910. In place of first variable 915 in L1C compatible signal 910, it includes a second variable 925.

Each signal has a length of 150 bits. Six signals having the same structure are emitted. The signal having such a configuration may be formed as a signal emitted from an indoor transmitter.

Each signal shown in FIG. 10 has the PRN-ID, and therefore, it is possible for location information providing apparatus 100 to specify the transmission source of the received signal based on the PRN-ID. If the transmission source is an indoor transmitter, the signal contains X-, Y- and Z-coordinate values. Therefore, location information providing apparatus 100 can display the indoor location.

<Signal Format>

The format of the signal transmitted by indoor transmitter 200 according to the present embodiment or the GPS satellite is not limited to the format described above. Now, referring to FIG. 11 to FIG. 16, other formats will be described.

[Message Type=0]

Figure 11:
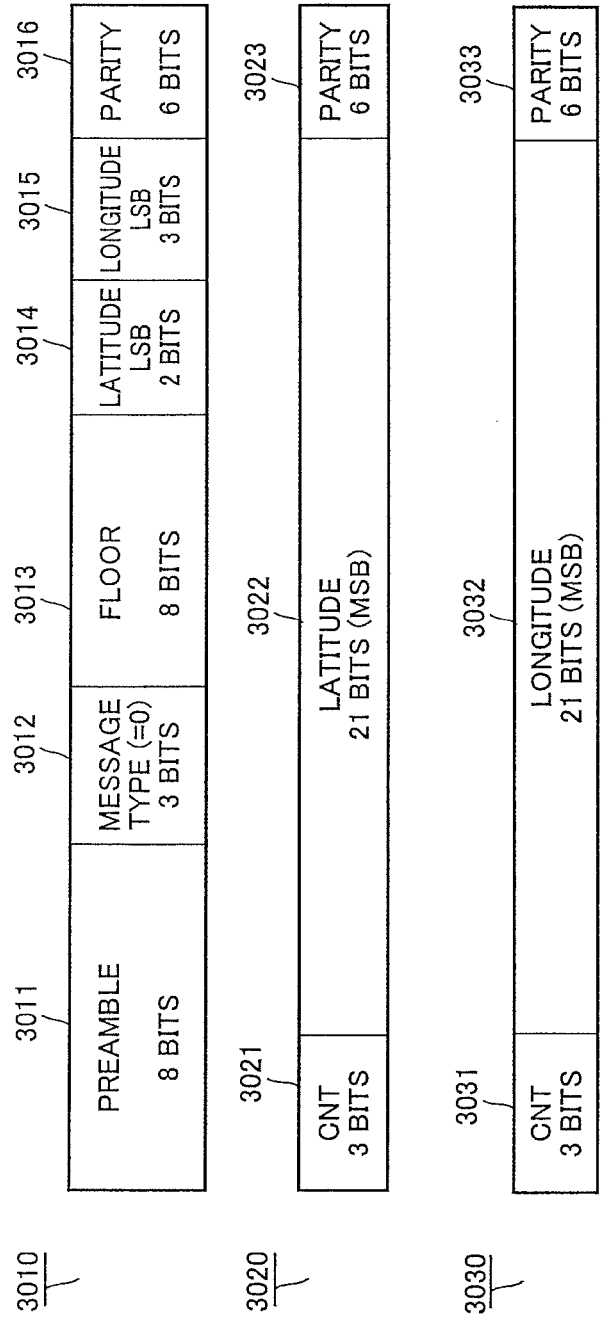
FIG. 11 schematically shows a format of an L1C/A signal formed of 3 words.

FIG. 11 schematically shows a format of an L1C/A signal formed of 3 words. This signal includes a first word 3010, a second word 3020, and a third word 3030. Each of the words has a length of 30 bits. This signal has a message type of, for example, "0".

First word 3010 includes: a preamble 3011 of 8 bits; a message type ID 3012 of 3 bits; floor data 3013 of 8 bits;, latitude (LSB) 3014 of 2 bit; longitude (LSB) 3015 of 3 bits; and a parity 3016 of 6 bits. Message type ID 3012 has a bit pattern of, for example, 000 (=indicative of type "0"), but other bit pattern can be used depending on its type. The bit pattern may be such that it distinguishes this signal from other signals.

Second word 3020 includes: CNT 3021 of 3 bits; latitude (MSB) 3022 of 21 bits; and a parity 3023 of 6 bits. Third word 3030 includes: CNT 3031 of 3 bits; latitude (MSB) 3032 of 21 bits; and a parity 3033 of 6 bits.

[Message Type=1]

Figure 12:
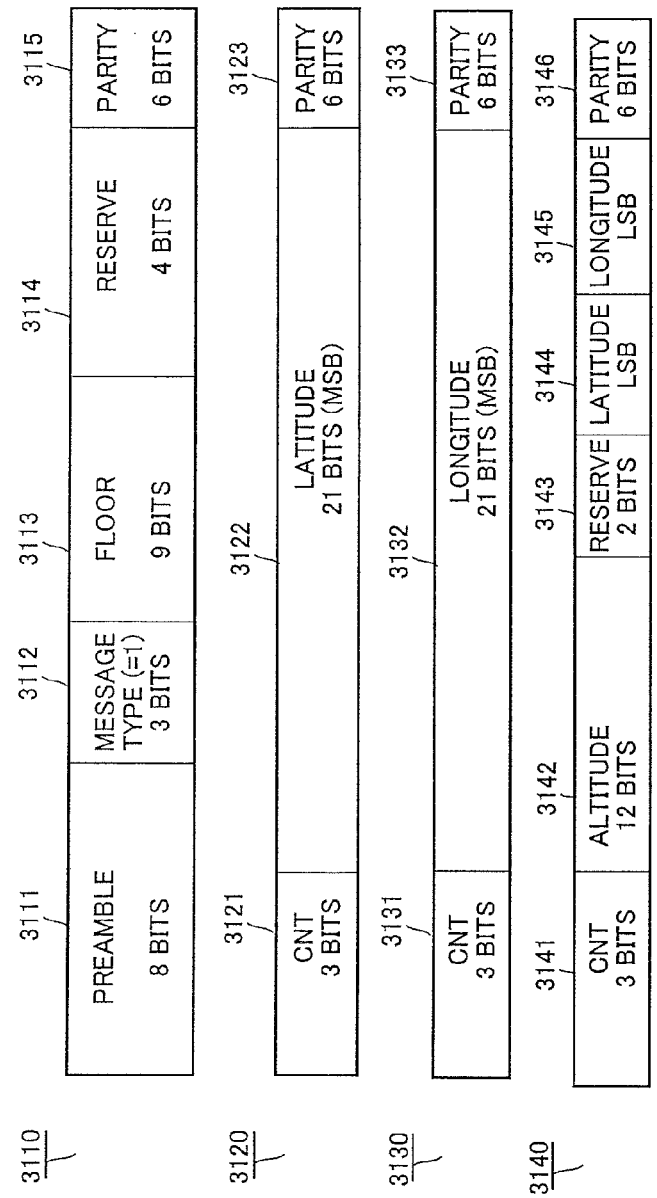
FIG. 12 schematically shows a format of an L1C/A signal formed of 4 words.

FIG. 12 schematically shows a format of an L1C/A signal formed of 4 words. This signal includes a first word 3110, a second word 3120, a third word 3130, and a fourth word 3140. Each of the words has a length of 30 bits. This signal has a message type of, for example, "1".

First word 3110 includes: a preamble 3111 of 8 bits, a message type ID 3112 of 3 bits; floor data 3113 of 9 bits; a reserve 3114 of 4 bits; and a parity 3115 of 6 bits. Message type ID 3112 has a bit pattern of, for example, 001 (=indicative of type "1"), but other bit pattern can be used depending on its type. The bit pattern may be such that it distinguishes this signal from other signals.

Second word 3120 includes: CNT 3121 of 3 bits; latitude (MSB) 3122 of 21 bits; and a parity 3123 of 6 bits. Third word 3130 includes: CNT 3131 of 3 bits; latitude (MSB) 3132 of 21 bits; and a parity 3133 of 6 bits. Fourth word 3140 includes: CNT 3141 of 3 bits; altitude 3142 of 12 bits; a reserve 3143 of 2 bits; latitude (LSB) 3144 of 3 bits; longitude (LSB) 3145 of 3 bits; and a parity 3146 of 6 bits.

[Message Type=3]

Figure 13:
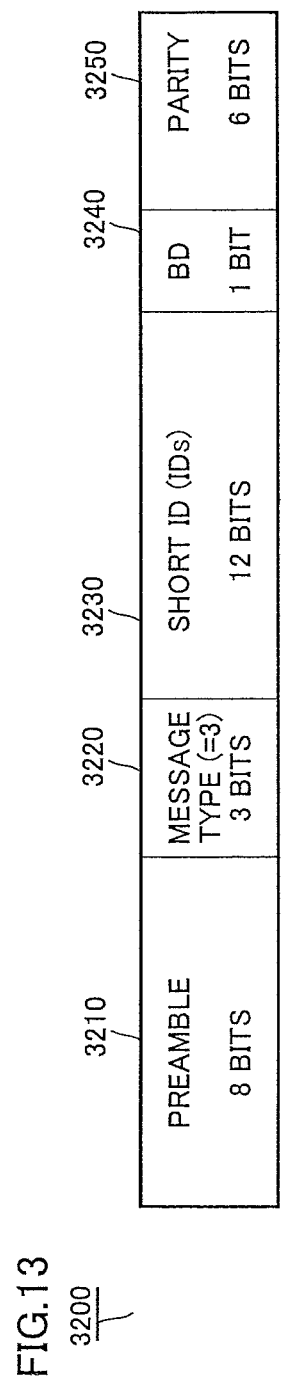
FIG. 13 schematically shows a format of an L1C/A signal 3200 including a short ID.

FIG. 13 schematically shows a format of an L1C/A signal 3200 including a short ID. Signal 3200 has a message type of, for example, "3".

Signal 3200 includes: a preamble 3220 of 8 bits; a message type ID 3220 of 3 bits; a short ID (SID) 3230 of 12 bits; BD 3240 of 1 bit; and a parity 3250 of 6 bits. Message type ID 3220 has a bit pattern of, for example, 011 (=indicative of type "3"), but other bit pattern can be used depending on its type. The bit pattern may be such that it distinguishes this signal from other signals.

[Message Type=4]

Figure 14:
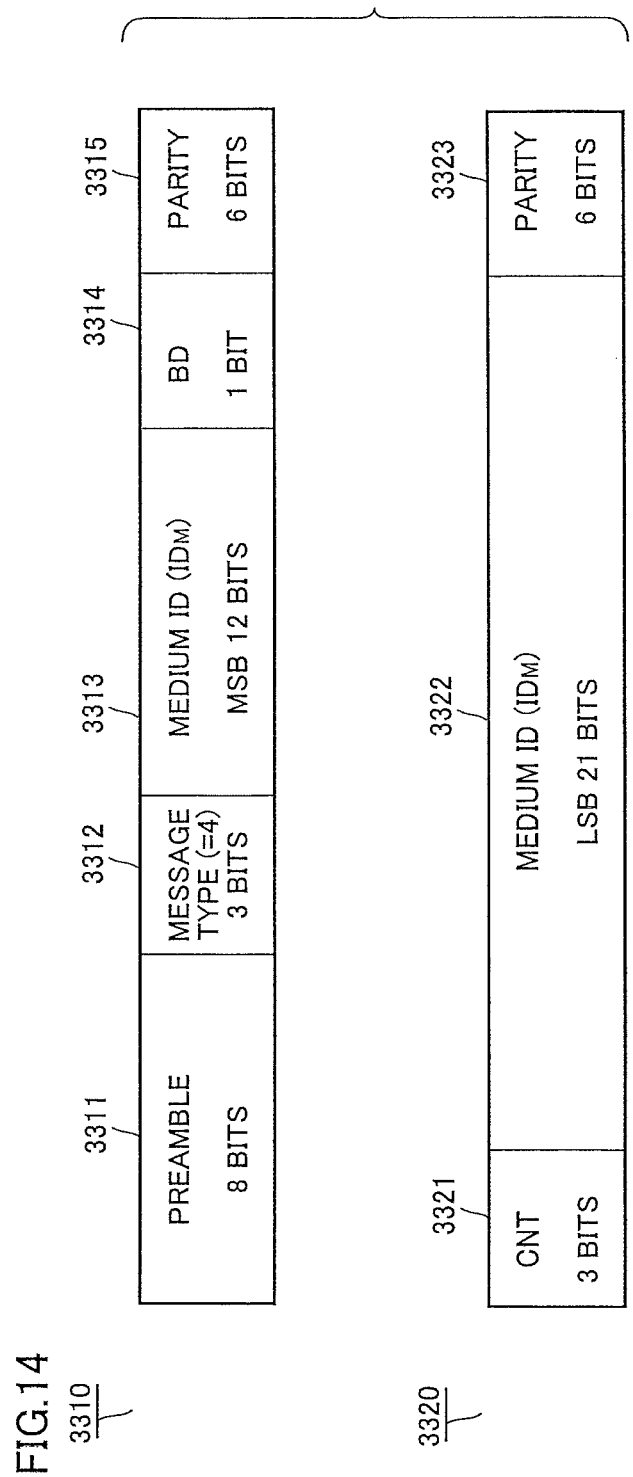
FIG. 14 schematically shows a format of an L1C/A signal including a medium ID.

FIG. 14 schematically shows a format of an L1C/A signal including a medium ID. This signal has a message type of, for example, "4".

This signal includes a first word 3310, and a second word 3320. First word 3310 includes: a preamble 3311 of 8 bits; a message type ID 3312 of 3 bits; a short ID (IDM) (MSB) 3313 of 12 bits; BD 3314 of 1 bit; and a parity 3315 of 6 bits. Message type ID 3312 has a bit pattern of, for example, 100 (=indicative of type "4"), but other bit pattern can be used depending on its type. The bit pattern may be such that it distinguishes this signal from other signals. Second word 3320 includes: CNT 3321 of 3 bits; a medium ID (MID) (LSB) 3322 of 21 bits; and a parity 3323 of 6 bits.

Figure 15:
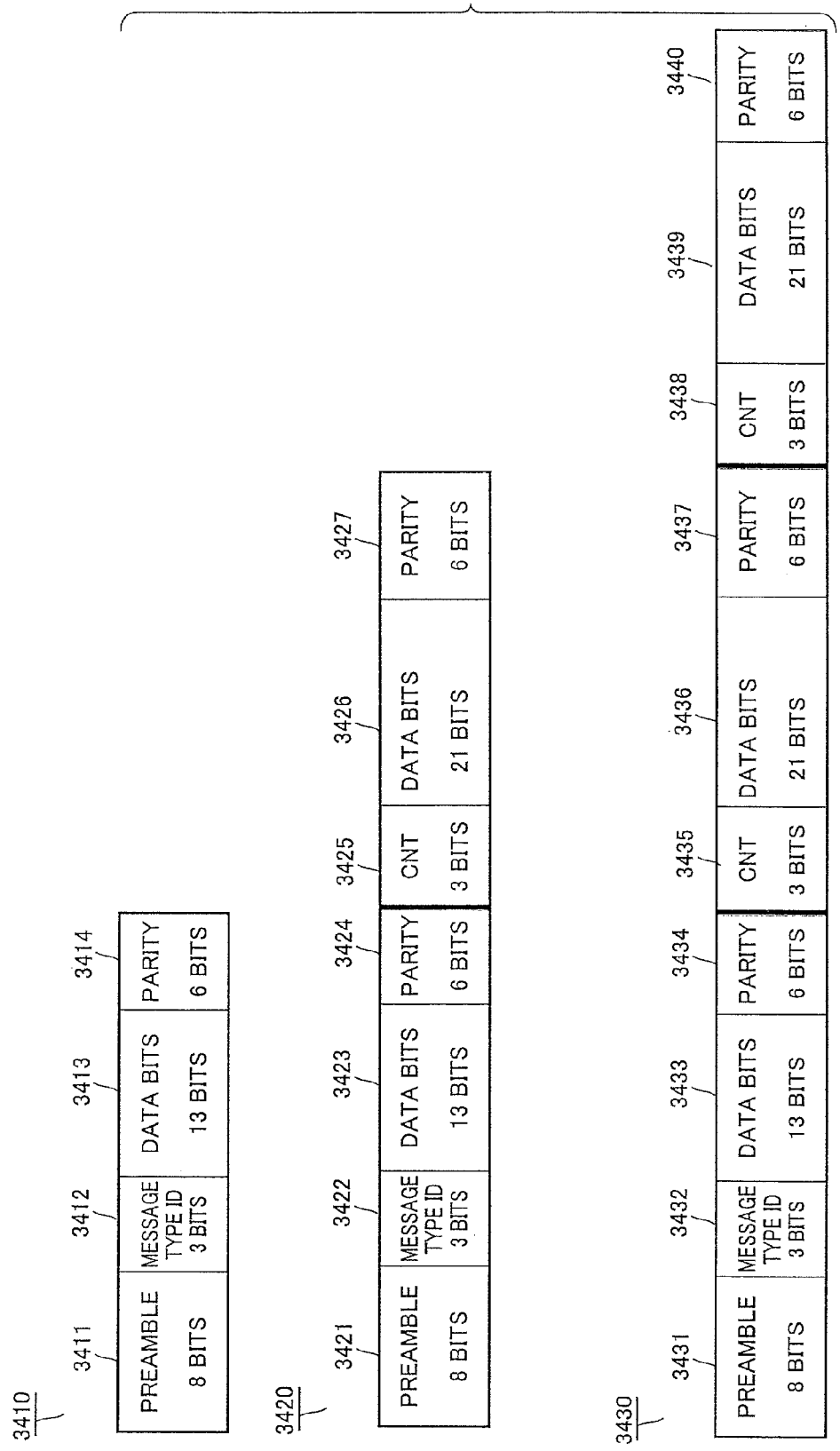
FIG. 15 shows a frame configuration configured in accordance with the number of words.

Referring to FIG. 15, an exemplary frame configuration will be described. FIG. 15 shows a frame configuration configured in accordance with the number of words. Each of the words has a length of 30 bits.

Frame 3410 is formed of 1 word. Frame 3410 includes: a preamble 3411 of 8 bits; a message type ID 3412 of 3 bits; data bits 3413 of 13 bits; and a parity 3414 of 6 bits.

Frame 3420 is formed of 2 words. The first word of frame 3420 includes: a preamble 3421 of 8 bits; a message type ID 3422 of 3 bits; data bits 3423 of 13 bits; and a parity 3424 of 6 bits. The second word of frame 3420 includes: CNT 3425 of 3 bits; data bits 3426 of 21 bits; a parity 3427 of 6 bits.

Frame 3430 is formed of 3 words. The first word of frame 3430 includes: a preamble 3431 of 8 bits; a message type ID 3432 of 3 bits; data bits 3433 of 13 bits; and a parity of 6 bits. The second word of frame 3430 includes: CNT 3435 of 3 bits; 3426 of 21 bits; a parity 3437 of 6 bits. The third word of frame 3430 includes: CNT 3438 of 3 bits; data bits 3439 of 21 bits; and a parity 3440 of 6 bits.

Figure 16:
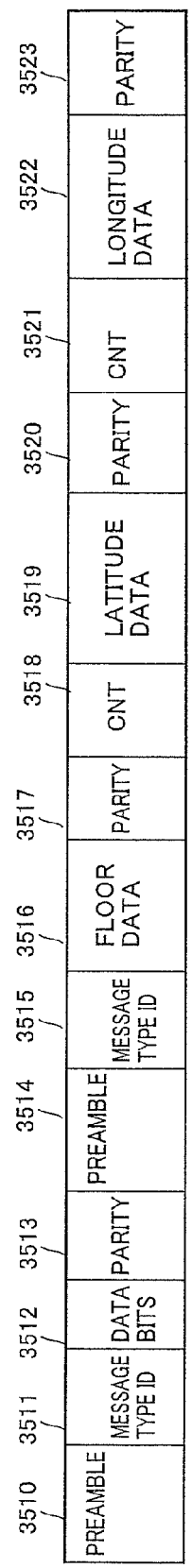
FIG. 16 schematically shows a frame 3500 including a short ID and location information.

Referring to FIG. 16, another exemplary frame configuration will be described. FIG. 16 schematically shows a frame 3500 including a short ID and location information.

The first word of frame 3500 includes: a preamble 3510; a message type ID 3512; data bits 3512; and a parity 3513. The second word includes a preamble 3514, a message type ID 3515, floor data 3516, and a parity 3517. The third word includes CNT 3518, latitude data 3519, and a parity 3520. The fourth word includes CNT 3521, longitude data 3522, and a parity 3523. The location information is formed of the second to fourth words.

EXAMPLE 1

(Gist of System of Example 1)

As described above, the format of the signal transmitted from indoor transmitter 200 is not limited to one but various formats can be used.

However, in the description below, it is assumed that the transmitter ID, which is an identifier for identifying the location of indoor transmitter 200, is transmitted as a short ID (hereinafter, referred to as "SID"). However, the data format to transmit the identifier for identifying the location of indoor transmitter 200 is not limited to the SID. For example, a medium ID or the like can be used.

However, when the SID is used as the identifier, the SID is repeatedly transmitted in the shortest cycle among the formats of signal transmitted from the indoor transmitter. Hence, it is expected that the SID can be obtained in the shortest time by the receiver, i.e., location information providing apparatus 100.

The following describes gist of indoor positioning performed by indoor transmitter 200 and location information providing apparatus 100 in Example 1.

1) The SID is an indirect referencing identifier, which cannot resolve a location only by itself, and the use and distribution thereof as global identifier are impossible due to restriction of the number of bits. To address this, the SID is issued/managed in advance as a local identifier so as to guarantee uniqueness based on an individual "facility" as a unit (for example, building as a unit). Based on an individual "facility" as a unit, individual transmitters are actually installed/managed.

2) Next, the SID issued/managed based on a facility as a unit and the installation location of each indoor transmitter are correlated with each other by an ID platform on indoor map data generated in accordance with the SVG (i.e., a conversion table is prepared), thus superimposing/including it on/in the SVG map information to be provided to location information providing apparatus 100 (hereinafter, such SVG map information including the conversion table will be referred to as "SVG container").

3) At an entrance of or inside the facility, a short URL is emitted using a signal having a message type of 4 and the SVG container (the indoor map+the information layer+the SID conversion table) is transmitted to location information providing apparatus 100 of the user (to display the current location thereof on the indoor map on location information providing apparatus 100 and store the SID conversion table therein).

4) After locally obtaining the SVG container in location information providing apparatus 100, the conversion table thus locally stored is used to resolve the location only using the terminal while the indoor transmitter and the terminal do not make reference to the external server. Accordingly, the current location on the indoor map and information about its vicinity are updated. In this way, there can be implemented high-speed continuous positioning/information distribution that follows moving speed (for example, walking speed) of a movable body such as a human.

[Configuration of Location Information Providing Apparatus 100-1 (Receiver)]

Figure 17:
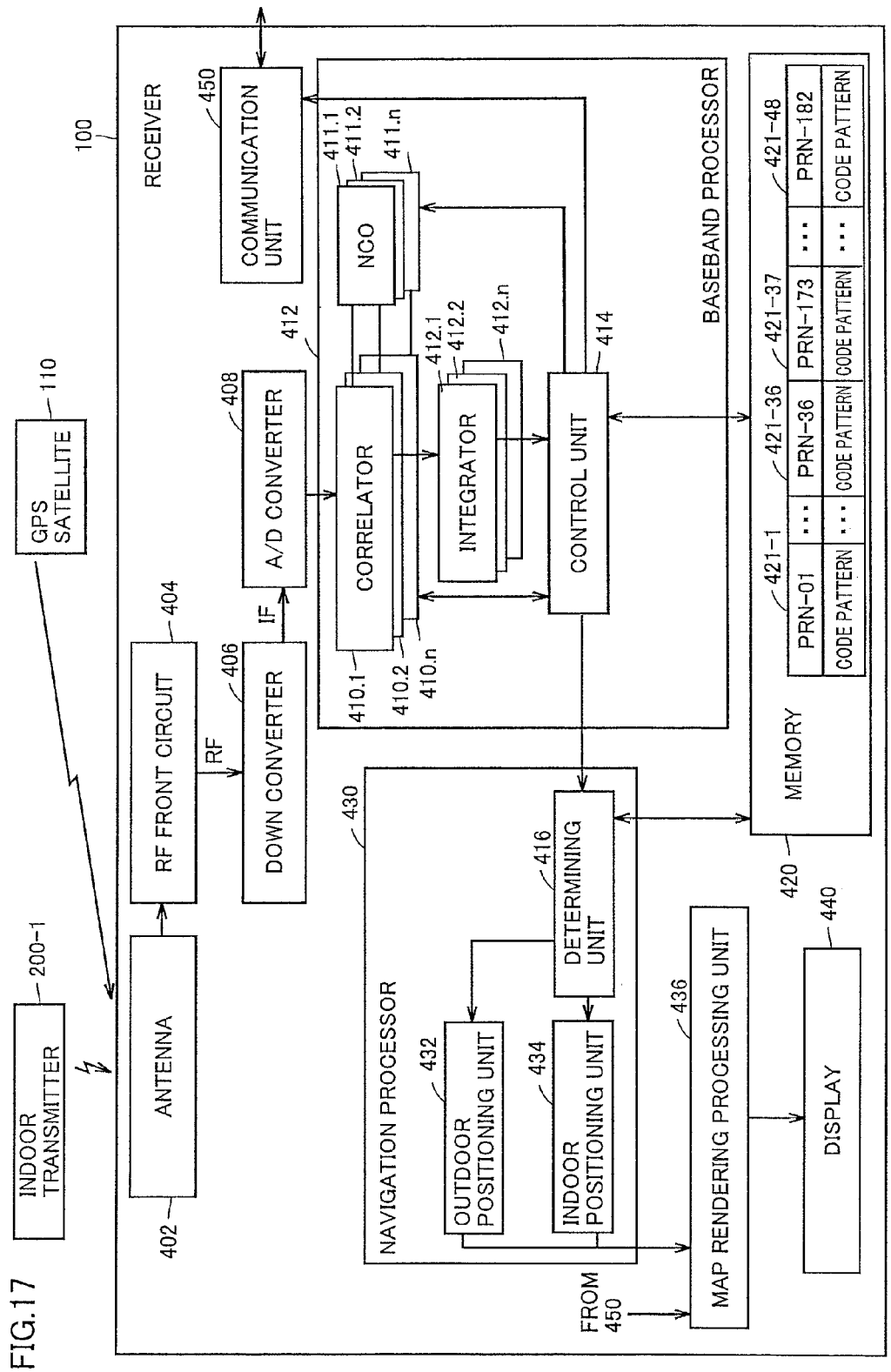
FIG. 17 is a block diagram showing a hardware configuration of location information providing apparatus 100.

Referring to FIG. 17, the following describes location information providing apparatus 100 for presenting location information to the user. FIG. 17 is a block diagram showing hardware configuration of location information providing apparatus 100.

Location information providing apparatus 100 includes an antenna 402, an RF (Radio Frequency) front circuit 404 electrically connected to antenna 402, a down converter 406 electrically connected to RF front circuit 404, an A/D (Analog to Digital) converter 408 electrically connected to down converter 406, a baseband processor 412 for receiving a signal from A/D converter 408 to perform a correlation process, a memory 420 electrically connected to baseband processor 412, a navigation processor 430 electrically connected to baseband processor 412, and a display 440 electrically connected to navigation processor 430.

Baseband processor 412 includes: correlators 410.1 to 410.*n* electrically connected to A/D converter 408; numerically controlled oscillators (NCO) 411.1 to 411.*n* for supplying clocks as a reference for the timing of correlation processes by correlators 410.1 to 410.*n*, respectively; and integrators 412.1 to 412.*n* for receiving signals from correlators 410.1 to 410.*n* and performing integration for a prescribed time period.

Baseband processor 412 further includes a control unit 414 for decoding signals from integrators 412.1 to 412.*n* and controlling operations of correlators 410.1 to 410.*n*, NCOs 411.1 to 411.*n* and integrators 412.1 to 412.*n*, based on the software stored in memory 420.

Generally, baseband processor 412 performs the correlation process in consideration of an influence of Doppler effect on each received signal, and performs not only the search for the PRN code and the delay component thereof but also the search for frequency, by controlling frequencies of NCOs 411.1 to 411.*n*, under the control of control unit 414.

In the example shown in FIG. 17, correlators 410.1 to 410.*n* and integrators 412.1 to 412.*n* may be implemented as hardware independent from baseband processor 412. Alternatively, the functions of correlators 410.1 to 410.*n* and integrators 412.1 to 412.*n* may be realized by software.

Memory 420 includes a plurality of areas for storing code patterns of PRN codes, which are data for identifying the emission sources of the positioning signals. By way of example, according to an aspect, when 48 code patterns are used, memory 420 includes areas 421-1 to 421-48 as shown in FIG. 17. According to another aspect, when a larger number of code patterns are used, a larger number of areas are secured in memory 420. On the contrary, it is also possible that code patterns smaller in number than the areas secured in memory 420 are used.

Consider an example in which 48 code patterns are used. Here, if 24 satellites are used for the satellite positioning system, 24 identification data for identifying the respective satellites and 12 spare data are stored in areas 421-1 to 421-36. Here, in area 421-1, for example, a code pattern of a pseudo noise code for the first satellite is stored. By reading the code pattern from here and performing cross-correlation process with the received signal, signal tracking and deciphering of navigation message included in the signal become possible. Though a method in which the code pattern is stored and read has been described as an example here, a method is also possible in which the code pattern is generated by a code pattern generator. The code pattern generator is realized, for example, by combining two feedback registers. Configuration and operation of the code pattern generator are readily understood by a person skilled in the art. Therefore, detailed description thereof will not be repeated.

Similarly, code patterns of pseudo noise codes allotted to the indoor transmitters for emitting positioning signals are stored in areas 421-37 to 421-48. For example, a code pattern of a pseudo noise code allotted to the first indoor transmitter is stored in area 421-37 and area 421-48. It is preferred that which spread code (PRN code) and which indoor transmitter are allocated as a set is stored in advance in memory 420. If such allocation is stored in advance, synchronization and acquisition for two channels can be done in a shorter time period.

In this case, in the present example, indoor transmitters having 12 code patterns are usable. Here, indoor transmitters may be arranged such that indoor transmitters having the same code pattern are not placed in a scope of coverage of one location information providing apparatus. By such an arrangement, it becomes possible to install six or more indoor transmitters on one floor of building 130, for example.

Navigation processor 430 includes: a determining unit 416 for determining the emission source of a positioning signal based on data output from control unit 414, determining whether the received positioning signal has been transmitted by diversity transmission, and controlling the operation of control unit 414; an outdoor positioning unit 432 for measuring the outdoor location of location information providing apparatus 100 based on the signal output from determining unit 416 based on the software stored in memory 420; and an indoor positioning unit 434 for extracting information representing the indoor location of location information providing apparatus 100 based on the data output from determining unit 416.

Antenna 402 can receive positioning signals emitted from GPS satellites 110, 111 and 112, respectively, and a positioning signal emitted from indoor transmitter 200-1. Further, when location information providing apparatus 100 is implemented as a mobile phone, antenna 420 can transmit/receive a signal for wireless telephone or a signal for data communication, in addition to the signals mentioned above.

A filter and an LNA (Low Noise Amplifier) circuit of RF front circuit 404 receive a signal received by antenna 402 and perform noise reduction, or filtering process for outputting a signal only in a predefined bandwidth. The signal output from RF front circuit 404 is input to down converter 406.

Down converter 406 amplifies the signal output from RF front circuit 404, and outputs it as an intermediate frequency signal. The signal is input to A/D converter 408. A/D converter 408 performs digital conversion of the input intermediate frequency signal, to a digital data. The digital data is input to correlators 410.1 to 410.$n$.

Correlators 410.1 to 410.$n$ perform correlation processes between the received signal and the code patterns read by control unit 414 from memory 420.

Correlators 410.1 to 410.$n$ simultaneously execute matching between the received positioning signal and the code patterns generated for demodulating the positioning signal, based on a control signal output from control unit 414.

Specifically, control unit 414 provides commands to correlators 410.1 to 410.$n$ to generate code patterns (replica patterns) reflecting delays (shifted code phases) that can be experienced on the pseudo noise code. The commands lead to patterns of the number of satellites×2×1023 (length of code pattern of the used pseudo noise code) in the current GPS. Correlators 410.1 to 410.$n$ generate, based on the commands thus provided, code patterns having different code phases, using the code pattern of the pseudo noise code defined for each satellite. Then, among all the generated code patterns, there is one pattern that matches the code pattern of the pseudo noise code used for modulating the received positioning signal. Therefore, by preparing beforehand correlators of the necessary number for matching process using respective code patterns in the form of parallel correlators 410.1 to 410.$n$, the code pattern of the pseudo noise code can be specified in very short period of time. This process is similarly applicable when location information providing apparatus 100 receives a signal from an indoor transmitter. Therefore, even when the user of location information providing apparatus 100 stays indoors, the location information can be obtained in a very short period of time.

Specifically, parallel correlators 410.1 to 410.$n$ are capable of executing matching processes in parallel for, at most, all of the code patterns of the pseudo noise codes defined for the satellites and the code patterns of the pseudo noise codes defined for the indoor transmitters. Even when collective matching for all the code patterns of the pseudo noise codes defined for the satellites and indoor transmitters is not carried out because of a relation between the number of correlators and the number of code patterns of pseudo noise codes allotted to the satellites and indoor transmitters, the time necessary for obtaining location information can significantly be reduced through parallel processing by the plurality of correlators.

Here, the satellites and indoor transmitters transmit signals using the same communication method of spread spectrum technique, and the same type of code patterns of pseudo noise codes can be allotted to the satellites and indoor transmitters. Therefore, the parallel correlators can be used both for the signals transmitted from the satellites and those transmitted from the indoor transmitters. Thus, receiving processes therefor can be performed in parallel, without necessitating any distinction between these.

Using each code pattern, parallel correlators 410.1 to 410.$n$ perform processes to track the positioning signal received by location information providing apparatus 100 and specify a code pattern that has a sequence matching the bit sequence of the positioning signal. Consequently, the code pattern of the pseudo noise code is specified and, therefore, determining unit 416 of location information providing apparatus 100 can determine from which satellite or from which indoor transmitter the received positioning signal has been transmitted. If the received positioning signal is transmitted from an indoor transmitter, determining unit 416 also determines whether or not the positioning signal has been transmitted utilizing diversity transmission. Further, it is possible for location information providing apparatus 100 to demodulate and decipher the message, using the specified code pattern.

Specifically, determining unit 416 makes such determination as described above, and transmits data in accordance with the result of determination to navigation processor 430. Determining unit 416 determines whether the PRN-ID included in the received positioning signal is the PRN-ID allotted to indoor transmitter 200-1 or the like other than a transmitter mounted on a GPS satellite.

Here, an example will be described in which 24 GPS satellites are used in the positioning system. Here, 36 pseudo noise codes, including spare codes, are used. In this example, PRN-01 to PRN-24 are used as numbers (PRN-IDs) for identifying respective GPS satellites, and PRN-25 to PRN-36 are used as numbers for identifying spare satellites. The spare satellite refers to a satellite launched in addition to the originally launched satellites. Specifically, such a satellite is launched in case a GPS satellite or a transmitter or the like mounted on a GPS satellite fails.

Further, it is assumed that code patterns of 12 pseudo noise codes are allotted to indoor transmitter 200-1 and the like other than the transmitters mounted on the GPS satellites. Here, numbers different from the PRN-IDs allotted to the satellites, for example, PRN-37 to PRN-48, are allotted to the respective transmitters. Therefore, it follows that in the present example, there are 48 PRN-IDs. Here, PRN-37 to PRN-48 are allotted to the indoor transmitters in accordance with, for example, the arrangement of indoor transmitters. Therefore, if used transmission output is not such that it causes interference of signals emitted from the indoor transmitters, the same PRN-ID may be used for different indoor transmitters. This arrangement allows use of transmitters larger in number than the PRN-IDs allotted for the transmitters on the ground.

Therefore, determining unit 416 makes reference to code patterns 422 of the pseudo noise codes stored in memory 420 to determine whether the code pattern obtained from the received positioning signal matches a code pattern allotted to an indoor transmitter. If these code patterns match, determining unit 416 determines that the positioning signal has been emitted from an indoor transmitter. Otherwise, determining unit 416 determines that the signal has been emitted from a GPS satellite, and determines, with reference to the code patterns stored in memory 402, to which GPS satellite the obtained code pattern has been allotted. Though it has been illustrated that the code pattern is used for determination, the determination may be made by comparison of other data. For example, comparison using PRN-IDs may be used for the determination.

If the received signal is emitted from a GPS satellite, determining unit 416 transmits the data obtained from the specified signal to outdoor positioning unit 432. The data obtained from the signal includes a navigation message. If the received signal is emitted from indoor transmitter 200-1 or the like, determining unit 416 transmits data obtained from the signal to indoor positioning unit 434. The data represents coordinate values set in advance, as data for specifying the location of indoor transmitter 200-1. According to another aspect, a number for identifying the transmitter may be used.

In navigation processor 430, outdoor positioning unit 432 executes a process for calculating the location of location information providing apparatus 100 based on the data transmitted from determining unit 416. Specifically, using data included in signals emitted from three or more (preferably, four or more) GPS satellites, outdoor positioning unit 432 calculates propagation time of each signal, and based on the result of calculation, finds the location of location information providing apparatus 100. The process is executed by a known method of satellite positioning. The process can be readily understood by a person skilled in the art. Therefore, detailed description thereof will not be repeated here.

On the other hand, in navigation processor 430, indoor positioning unit 434 executes a positioning process when location information providing apparatus 100 exists indoors, based on the data output from determining unit 416. As described above, indoor transmitter 200-1 emits a positioning signal including data (location specifying data) for specifying a location. Therefore, if location information providing apparatus 100 receives such a signal, data can be extracted from the signal and can be used to derive the location of location information providing apparatus 100. Indoor positioning unit 434 performs this process. Using the data calculated by outdoor positioning unit 432 or indoor positioning unit 434 and based on the SVG map information already stored in memory 420 or the SVG map information received via communication unit 450, map rendering processing unit 436 generates and outputs an image signal for displaying the current location of location information providing apparatus 100 on display 440. Specifically, the data are incorporated in data for displaying a screen, and an image representing the measured location or an image for displaying the location where indoor transmitter 200-1 is installed is generated and displayed on display 440.

Hence, map rendering processing unit 436 has a function as a browser for displaying a map based on the SVG map information.

Location information providing apparatus 100 has a communication unit 450 for exchanging data with the outside, for example, with a location information providing server (not shown), under control of control unit 414.

In the configuration shown in FIG. 17, though not specifically limiting, in the signal processing from reception of a positioning signal to generation of information to be displayed on the display, antenna 402, RF front circuit 404, down converter 406 and A/D converter 408 are implemented by hardware, and the processes of baseband processor 412 and navigation processor 430 may be executed by a program stored in memory 420. Processes of correlators 410.1 to 410.n and integrators 412.1 to 412.n may be realized by software, in place of hardware.

Figure 18:
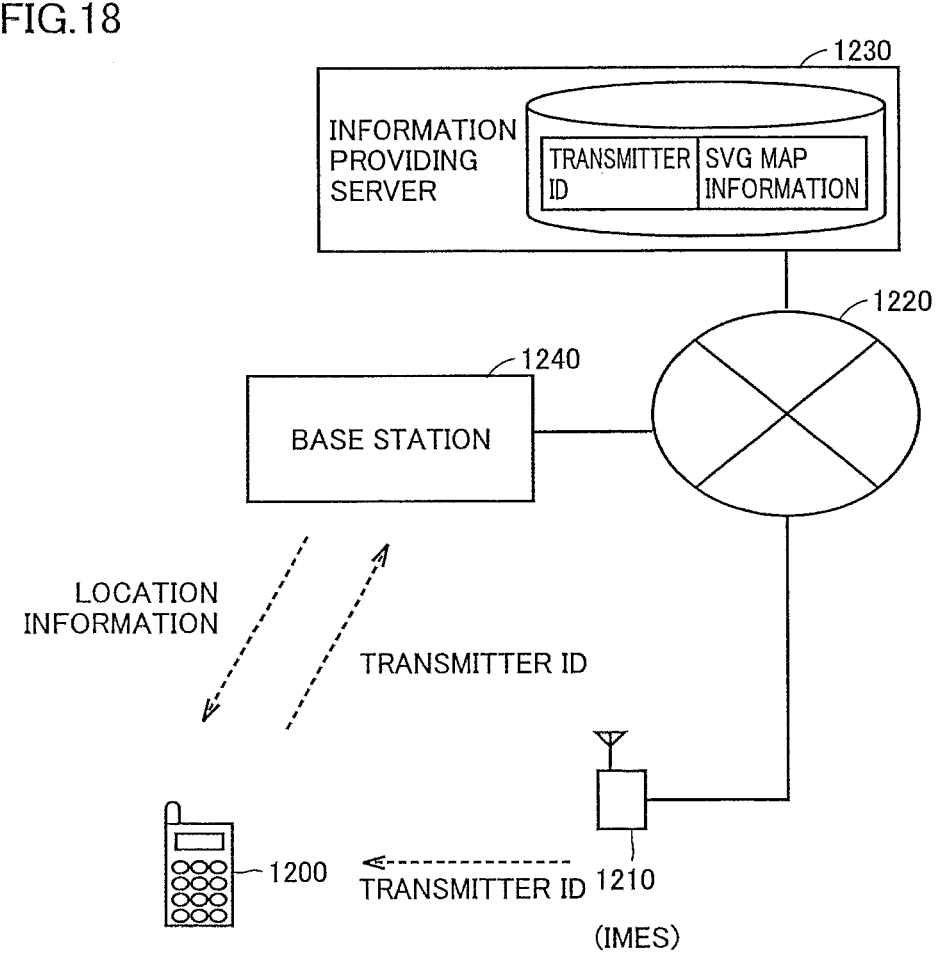
FIG. 18 shows a manner of use of location information providing apparatus 100 in accordance with the present embodiment.

FIG. 18 shows a manner of use of location information providing apparatus 100 in accordance with the present example. Here, the location information providing apparatus is implemented as mobile phone 1200. Mobile phone 1200 can receive a positioning signal emitted by an indoor transmitter 1210. Indoor transmitter 1210 is connected to Internet 1220. Internet 1220 is connected to an information providing server 1230 that can provide information related to indoor transmitter 1210. It is assumed that information providing server 1230 has a database in which a plurality of transmitter IDs and pieces of SVG map information respectively corresponding to the transmitter IDs are registered. Internet 1220 is also connected to a base station 1240 for communication with mobile phone 1200.

When mobile phone 1200 receives a signal emitted by indoor transmitter 1210, it obtains a transmitter ID for identifying indoor transmitter 1210 from the signal. The transmitter ID, for example, is associated with the PRN-ID described above. Mobile phone 1200 transmits the transmitter ID (optionally with the PRN-ID) to information providing server 1230. Specifically, mobile phone 1200 starts communication with base station 1240, and transmits packet data including the obtained transmitter ID to information providing server 1230.

Recognizing the transmitter ID, information providing server 1230 makes reference to a database associated with the transmitter ID, and reads SVG map information associated with the ID. When information providing server 1230 transmits the data of the SVG map information to base station 1240, base station 1240 wirelessly emits data of the SVG map information. When mobile phone 1200 detects arrival of the data, mobile phone 1200 can obtain the location of indoor transmitter 1210 from the data in accordance with a browsing operation by the user of mobile phone 1200.

Figure 19:
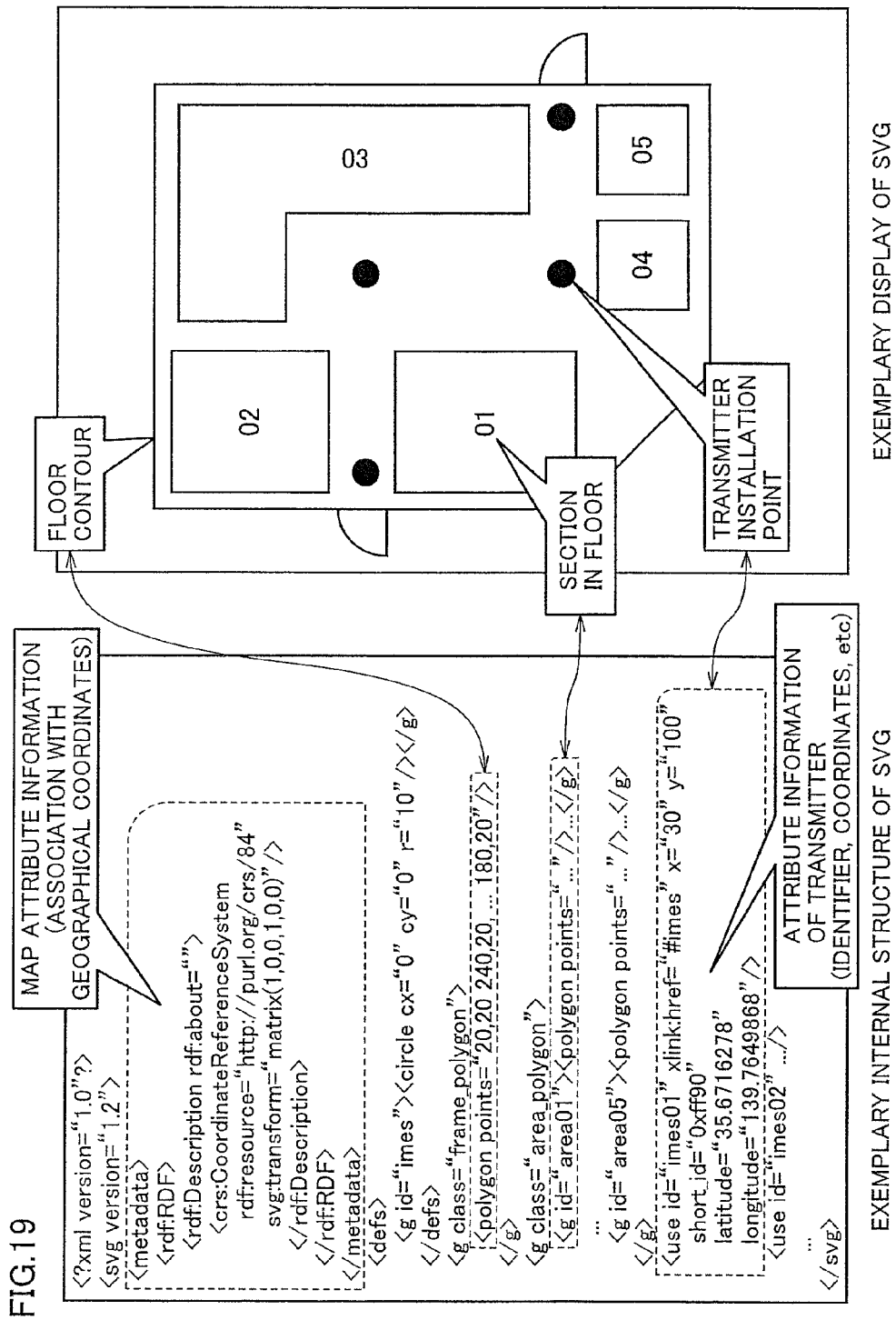
FIG. 19 shows a comparison between data (SVG container) of SVG map information and a map image displayed in accordance with the data of the SVG map information.

FIG. 19 shows a comparison between the data (SVG container) of the SVG map information and the map image displayed in accordance with the data of the SVG map information.

The example shown in FIG. 19 illustrates a case where a specific floor in a certain building is expressed by the data of the SVG map information. The data of the SVG map information includes the following pieces of information:

(1) Map attribute information indicating a relation between the data of the SVG map information and geographical coordinates, i.e., generally, information for specifying a positional relation between a map indicating outdoors and the building having the floor;

(2) Information indicating a shape of a contour of the floor;

(3) Information indicating a shape of a section in the floor; and (4) Attribute information of each indoor transmitter installed in the floor. The ID of the indoor transmitter and the location information of the indoor transmitter in the floor (location identifier and location coordinates in the indoor map). This information corresponds to the conversion table between the SID and the location of the indoor transmitter.

Figure 20:
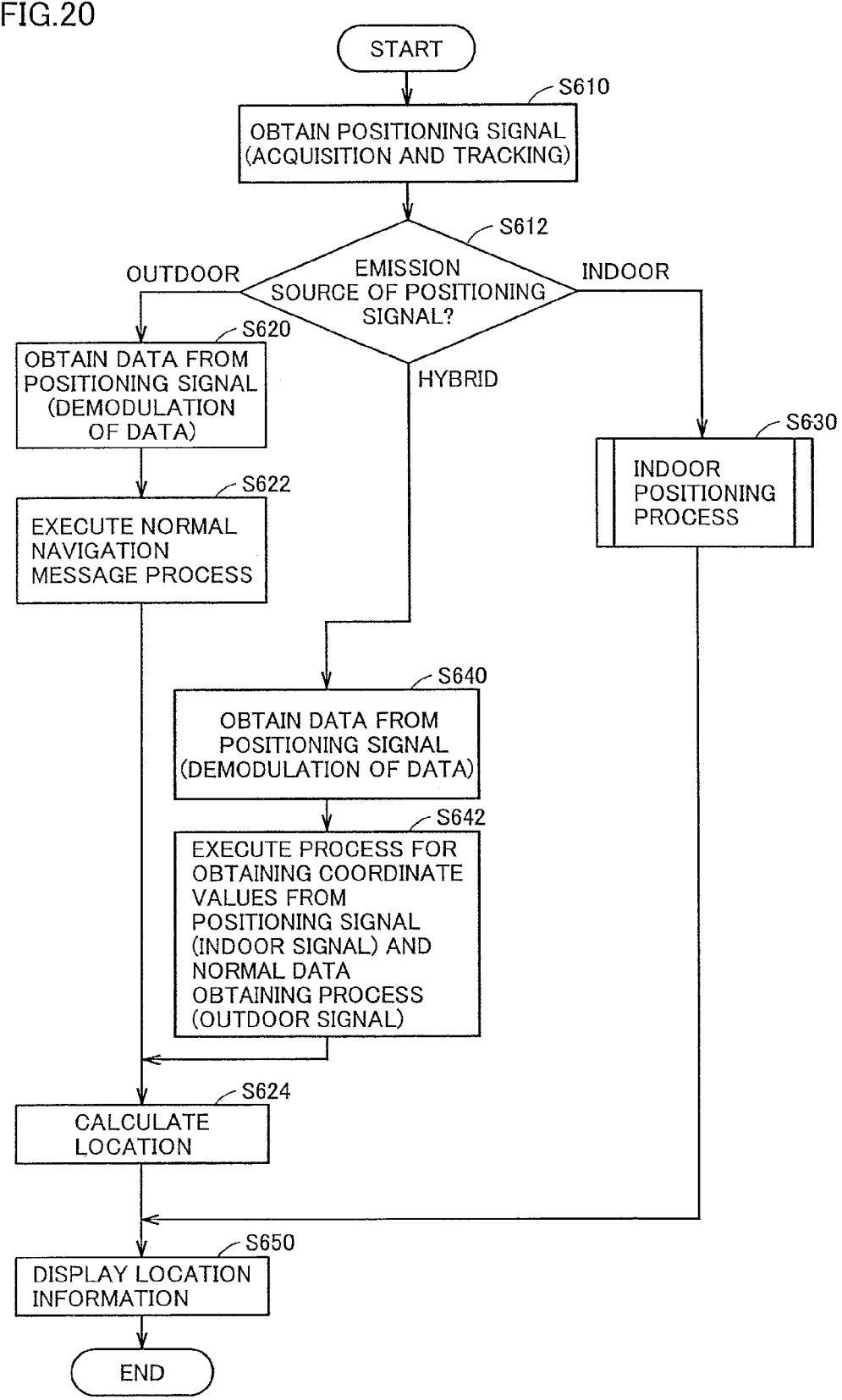
FIG. 20 is a flowchart showing a process procedure executed by a baseband processor 410 and a navigation processor 430 of location information providing apparatus 100.

Referring to FIG. 20, a control process of location information providing apparatus 100 will be described. FIG. 20 is a flowchart showing a process procedure executed by baseband processor 410 and navigation processor 430 of location information providing apparatus 100.

In step S610, location information providing apparatus 100 obtains (tracks and acquires) the positioning signal. Specifically, baseband processor 410 receives the received positioning signal (digitally converted data) from A/D converter 408. Baseband processor 410 generates, as replicas of pseudo noise codes, code patterns of which code phases are different with possible delays reflected, and detects presence/absence of correlation between each code pattern and the received positioning signal. The number of generated code patterns is, for example, twice the number of bits of the code pattern. By way of example, assume that the chip rate is 1023 bits. Then, 2046 code patterns each having a delay of one half bit, that is, code phase difference, can be generated. The processes of performing correlations of the received signal with the code patterns are executed in parallel. When an output not lower than a predefined intensity is detected in the correlation processes, baseband processor 410 locks the code pattern, and can specify the satellite that emitted the positioning signal, from the code pattern. There is only one pseudo noise code that has the bit sequence of the code pattern of interest. Therefore, the pseudo noise code used for spread spectrum coding of the received positioning signal can be specified.

In step S612, baseband processor 410 specifies the emission source of the positioning signal. Specifically, determining unit 416 specifies the emission source of the signal based on the PRN-ID corresponding to the transmitter that uses the code pattern of the pseudo random noise code used at the time of modulation for generating the signal. If the positioning signal has been emitted outdoors, the control proceeds to step S620. If the positioning signal is emitted indoors, the control proceeds to step 5630. If a plurality of received signals include signals emitted indoors and outdoors, the control proceeds to step S640.

In step S620, location information providing apparatus 100 demodulates the positioning signal, thereby to obtain data included in the signal. Specifically, outdoor positioning unit 432 of navigation processor 430 superimposes the code pattern temporarily stored in memory 420 (the above-described "locked" code pattern, hereinafter referred to as the "locked code pattern") on the positioning signal, to obtain navigation message from the sub frame forming the signal. In step S622, outdoor positioning unit 432 executes a normal navigation message process for calculating the location, using four or more obtained navigation messages.

In step S624, based on the result of the process, outdoor positioning unit 432 executes a process for calculating the location of location information providing apparatus 100. For instance, if location information providing apparatus 100 has received positioning signals emitted from four or more satellites, distance calculation is performed using orbit information, time information and the like of each satellite, included in the navigation message demodulated from each signal.

Further, in another aspect, when location information providing apparatus 100 receives both a positioning signal (outdoor signal) emitted from a satellite and a signal (indoor signal) emitted from an indoor transmitter in step S612, location information providing apparatus 100 demodulates the positioning signal in step S640 to obtain data included in the signal. Specifically, outdoor positioning unit 432 superimposes the locked code pattern on the positioning signal transmitted by baseband processor 410, thereby to obtain the data in the sub frame forming the positioning signal. In this case, location information providing apparatus 100 receives both a signal from a satellite and a signal from an indoor transmitter and, hence, it is operating in a so-called "hybrid" mode. Therefore, navigation message having time data is obtained from the signal from each satellite and data having location information such as the coordinate values and the like mentioned above is obtained from the signal from indoor transmitter. Namely, in step S642, indoor positioning unit 434 performs a process for obtaining X-coordinate value 563, Y-coordinate value 564 and Z-coordinate value 565 from the positioning signal emitted by indoor transmitter 200-1, and obtains navigation message from the positioning signal emitted by the GPS satellite and performs a process. Then, the control proceeds to step S624. In this case, in step S624, classification for determining a signal to be used in calculation for the location is performed based on, for example, the intensities of the indoor signals and the outdoor signals. By way of example, if an indoor signal has a higher intensity than an outdoor signal, the indoor signal is selected, and coordinate values included in the indoor signal are used as the location of location information providing apparatus 100.

On the other hand, in the case where the emission source of the positioning signal is in indoors in step S612 and the indoor signal has an intensity equal to or larger than a predetermined level, an indoor positioning process is subsequently performed in step S630, for example.

For example, in the indoor positioning process, determining unit 416 determines whether or not the mode is currently in the Q phase signal receiving mode. In the case where the mode is not the Q phase signal receiving mode (for example, the L1 C/A receiving mode or the I phase signal receiving mode in L1C), location information providing apparatus 100 then demodulates the positioning signal to obtain data included in the signal. Specifically, indoor positioning unit 434 superimposes the locked code pattern on the positioning signal sent from baseband processor 410, whereby the message data is obtained from the sub frame forming the positioning signal. The message data is included in the positioning signal emitted by the indoor transmitter, in place of a navigation message included in a positioning signal transmitted from a satellite. Hence, the format of the message data is preferably the same as the format of the navigation message. Indoor positioning unit 434 obtains coordinate values from the data (that is, data for specifying the installation location of the indoor transmitter (for example, X-coordinate value 563, Y-coordinate value 564 and Z-coordinate value 565 in signal 560)). If text information representing the installation location or an address of the installation location is included in the frame in place of such coordinate values, such text information is obtained.

On the other hand, when the Q phase signal receiving mode is selected in step S630, location information providing apparatus 100 subsequently demodulates the positioning signal in step S636 to obtain data (transmitter ID) included in the signal. In step S638, by transmitting this transmitter ID via a network, location information providing apparatus 100 receives, from a server (not shown), SVG map information data corresponding to the transmitter ID.

In step S650, map rendering processing unit 436 executes a process for displaying location information on display 440, based on the result of location calculation. Specifically, image data for displaying the obtained coordinates, or data for displaying the installation location of indoor transmitter 200-1 is generated and sent to display 440. Based on such data, display 440 displays the location information of location information providing apparatus 100 on a display area.

Figure 21:
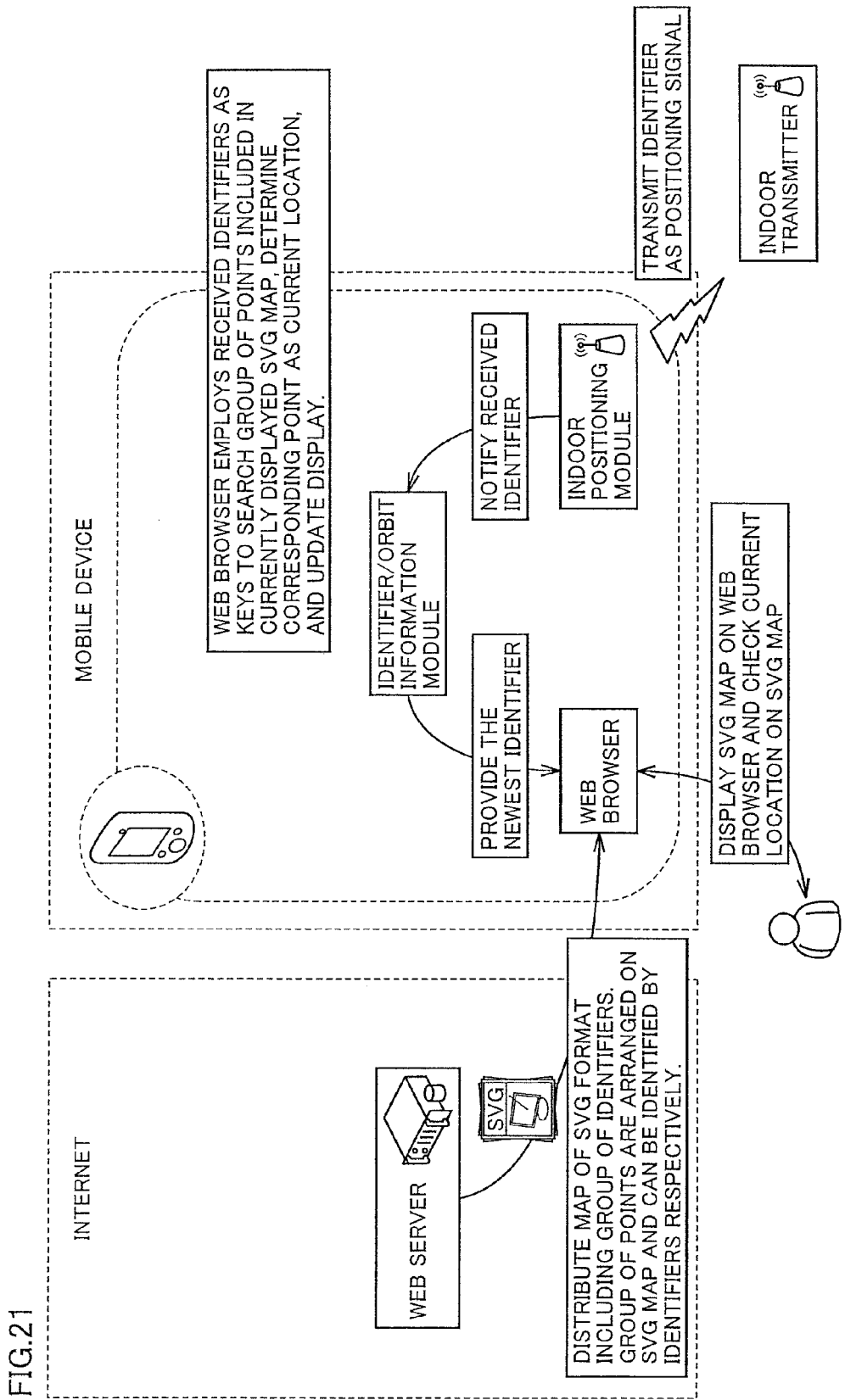
FIG. 21 schematically shows a process in the case where location information is presented in an indoor positioning process (S630) of FIG. 20 based on a transmitter ID (SID) and SVG map information data from a server.

FIG. 21 schematically shows a process in the case where location information is presented in the indoor positioning process (S630) of FIG. 20 based on the transmitter ID (SID) and the SVG map information data from the server. In FIG. 21, location information providing apparatus 100 is illustrated as a mobile device such as a mobile phone. Referring to FIG. 21, upon entering of the indoor facility, indoor transmitter 200 emits a short URL using a signal having a message type of 4 at the entrance or in the inside of the facility so as to transmit the SVG container (indoor map+ information layer+SID conversion table) to location information providing apparatus 100 of the user.

In location information providing apparatus 100, in the case where it is determined that the emission source of the positioning signal at present is indoor transmitter 200 after entering the indoor facility, indoor positioning unit 434, which functions as an indoor positioning module in location information providing apparatus 100, first identifies the identifier transmitted from the indoor transmitter and provides notification thereof to an identifier/orbit information module in map rendering processing unit 436. Based on the identifier (transmitter ID (SID)) notified from the identifier/orbit information module, a web browser module in map rendering processing unit 436 receives the SVG map information via a network (for example, the Internet) from data on information providing server 1230 as specified by the URL. The SVG map information includes the conversion table between the identifier and the attribute information of the indoor transmitter corresponding to the identifier.

The web browser module displays the SVG map on display 440 as a web browser, and also displays the location of the indoor transmitter, from which the identifier has been received, on the SVG map.

With the configuration above, after locally obtaining the SVG map information in location information providing apparatus 100, the conversion table thus locally stored is used to resolve the location using only the terminal while the indoor transmitter and the terminal do not make reference to the external server, so as to update the current location on the indoor map and information about its vicinity. In this way, there is implemented high-speed continuous positioning/information distribution that follows moving speed (for example, walking speed) of a movable body such as a human.

It is noted that information for identifying a PRN code (spread code) for spectrum spread modulation in the indoor transmitter can be included in the conversion table, which is included in the SVG map information and is between the indoor transmitter's identifier transmitted from the indoor transmitter and the indoor transmitter's location information, so as to correspond to the identifier of each indoor transmitter. Examples of the information for identifying the PRN code (spread code) can include ID information of the PRN code. In this way, by downloading the map, the receiver can beforehand collectively obtain, as information, not only the identifier of the indoor transmitter installed in the vicinity of the entrance of the facility but also the identifier of an indoor transmitter installed around the foregoing indoor transmitter (for example, a plurality of indoor transmitters existing on the same floor). In this case, assistance is given in selection of a spread code to be used when the receiver acquires the positioning signal, whereby the positioning signal can be acquired at a higher speed.

EXAMPLE 2

Example 1 is concerned with the configuration in which the SVG map information is adapted to include the conversion table between the indoor transmitter's identifier transmitted from the indoor transmitter and the indoor transmitter's location information.

Example 2 is concerned with a configuration in which location information providing apparatus 100 also obtains orbit information of a positioning satellite to be used in outdoor positioning, when obtaining the SVG map information.

Specifically, for example, when location information providing apparatus 100 is started from a state in which it does not have orbit information (cold start), it is difficult to attain smooth positioning transfer because it requires a fair amount of time for obtainment of satellite data when handing over from indoors to outdoors. However, if the orbit information of the positioning satellite can be downloaded together with map information when obtaining the map information in indoors, positioning accuracy can be improved and positioning time can be shorter when handing over from indoor positioning to outdoor positioning.

Figure 22:
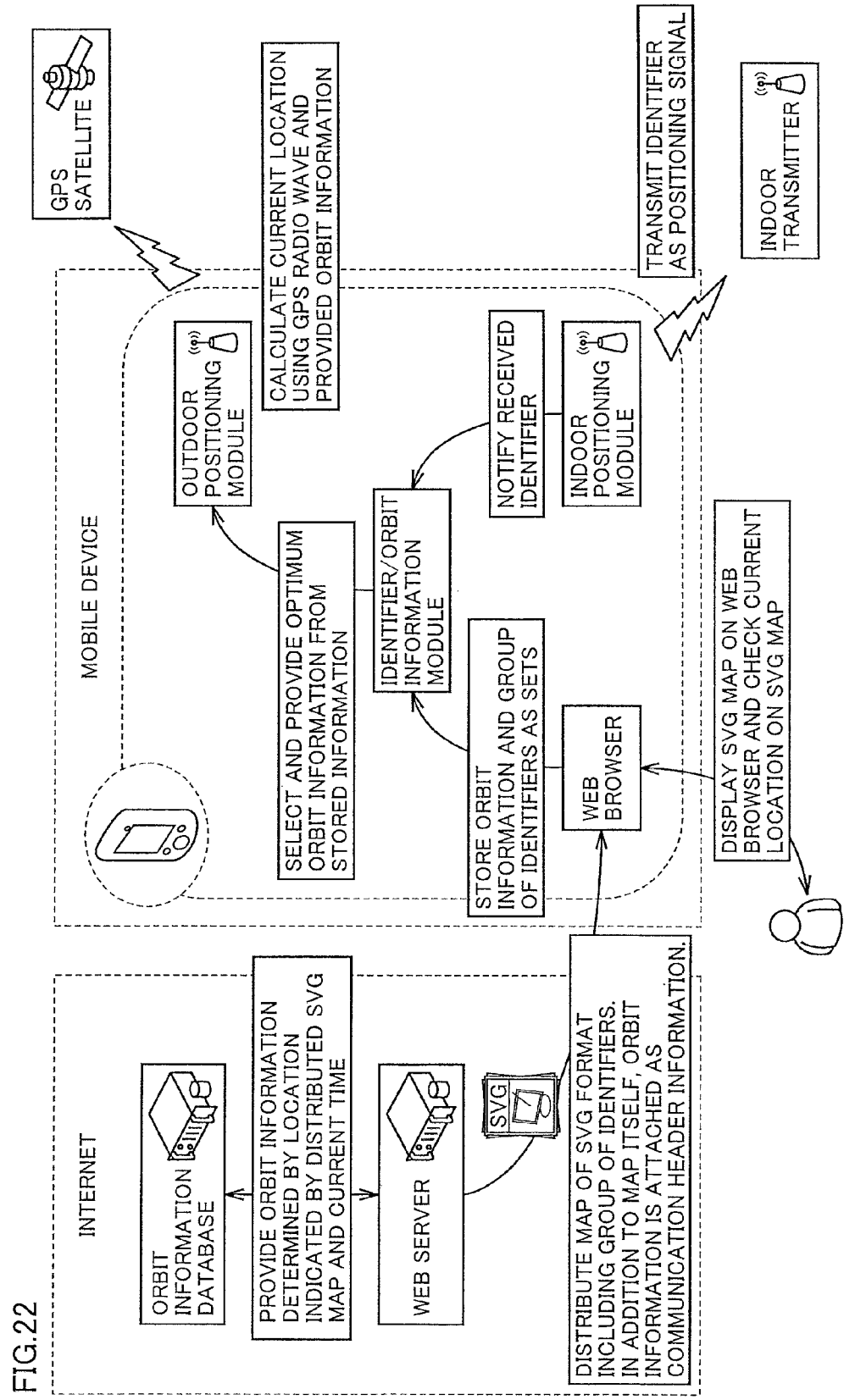
FIG. 22 schematically shows a process of indoor positioning and a process of outdoor positioning, which are based on an indoor transmitter's identifier from the indoor transmitter and SVG map information data from a server, the process of outdoor positioning utilizing orbit information received together with the SVG map information data.

FIG. 22 schematically shows a process of indoor positioning and a process of outdoor positioning, which are based on an indoor transmitter's identifier from the indoor transmitter and SVG map information data from a server. The process of the outdoor positioning utilizes orbit information received together with the SVG map information data. Also in FIG. 22, location information providing apparatus 100 is illustrated as a mobile device such as a mobile phone.

Referring to FIG. 22, in the positioning system of Example 2, in order to solve a problem of positioning accuracy decreased when moving from indoors to outdoors as well as a problem of positioning time, satellite orbit data is also distributed upon the distribution of the SVG container data in Example 1.

First, an orbit information database is provided on the Internet to provide orbit information of a positioning satellite. It is assumed that the information providing server (web server) obtains orbit information, which is determined by the location indicated by an SVG map to be distributed and current time, from the orbit information database.

Namely, as with Example 1, upon entering of an indoor facility, indoor transmitter 200 emits a short URL using a signal having a message type of 4 at the entrance or in the inside of the facility so as to transmit the SVG container (indoor map+information layer+SID conversion table) to location information providing apparatus 100 of the user.

In location information providing apparatus 100, in the case where it is determined that the emission source of the positioning signal at present is indoor transmitter 200 after entering the indoor facility, indoor positioning unit 434, which functions as an indoor positioning module in location information providing apparatus 100, first identifies the identifier transmitted from the indoor transmitter and provides notification thereof to an identifier/orbit information module in map rendering processing unit 436. Based on the identifier (transmitter ID (SID)) notified from identifier/orbit information module, a web browser module in map rendering processing unit 436 receives the SVG map information via a network (for example, the Internet) from data on information providing server 1230 specified by the URL. The SVG map information includes the conversion table between the identifier and the attribute information of the indoor transmitter corresponding to the identifier.

Here, by determining the SVG container (URL) of the building for which the obtainment is to be performed, the location of the facility in which the indoor positioning is to be performed (latitude/longitude coordinates of a representative point of the facility or the like) and time are specified, thereby determining satellite orbit information required for satellite positioning. With reference to the URL, satellite orbit data of the area/time is also transmitted from information providing server 1230 when obtaining the SVG container, and is stored locally in location information providing apparatus 100 (in memory 420) so as to be associated with the identifier. Specifically, there is employed a method in which the satellite orbit data corresponding to the identifier is embedded in header information of HTTP communication when referencing/obtaining the URL of the SVG container (transmitted as a short URL by means of a signal from the indoor transmitter to indicate a message type of 4), is transmitted, and is stored in Cookie of the browser (by storing it in the Cookie, expiration date can be controlled from the server side).

The web browser module displays the SVG map on display 440 as a web browser, and also displays the location of the indoor transmitter, from which the identifier has been received, on the SVG map.

Further, when location information providing apparatus 100 is brought from indoors to outdoors, outdoor positioning unit 432 selects optimum satellite orbit information from pieces of stored satellite orbit information (for example, satellite orbit information received most recently from information providing server 1230), calculates the current location thereof based on delay of time of reception of a positioning signal from a GPS satellite, using the optimum satellite orbit information rather than satellite orbit information included in the positioning signal from the GPS satellite.

With the configuration above, after locally obtaining the SVG map information in location information providing apparatus 100, the conversion table thus locally stored is used to resolve the location using only the terminal while the indoor transmitter and the terminal do not make reference to the external server, so as to update the current location on the indoor map and information about its vicinity. In this way, there is implemented high-speed continuous positioning/information distribution that follows moving speed (for example, walking speed) of a movable body such as a human. Moreover, when moving from indoors to outdoors, the optimum orbital satellite information can be used to perform the outdoor positioning.

Figure 23:
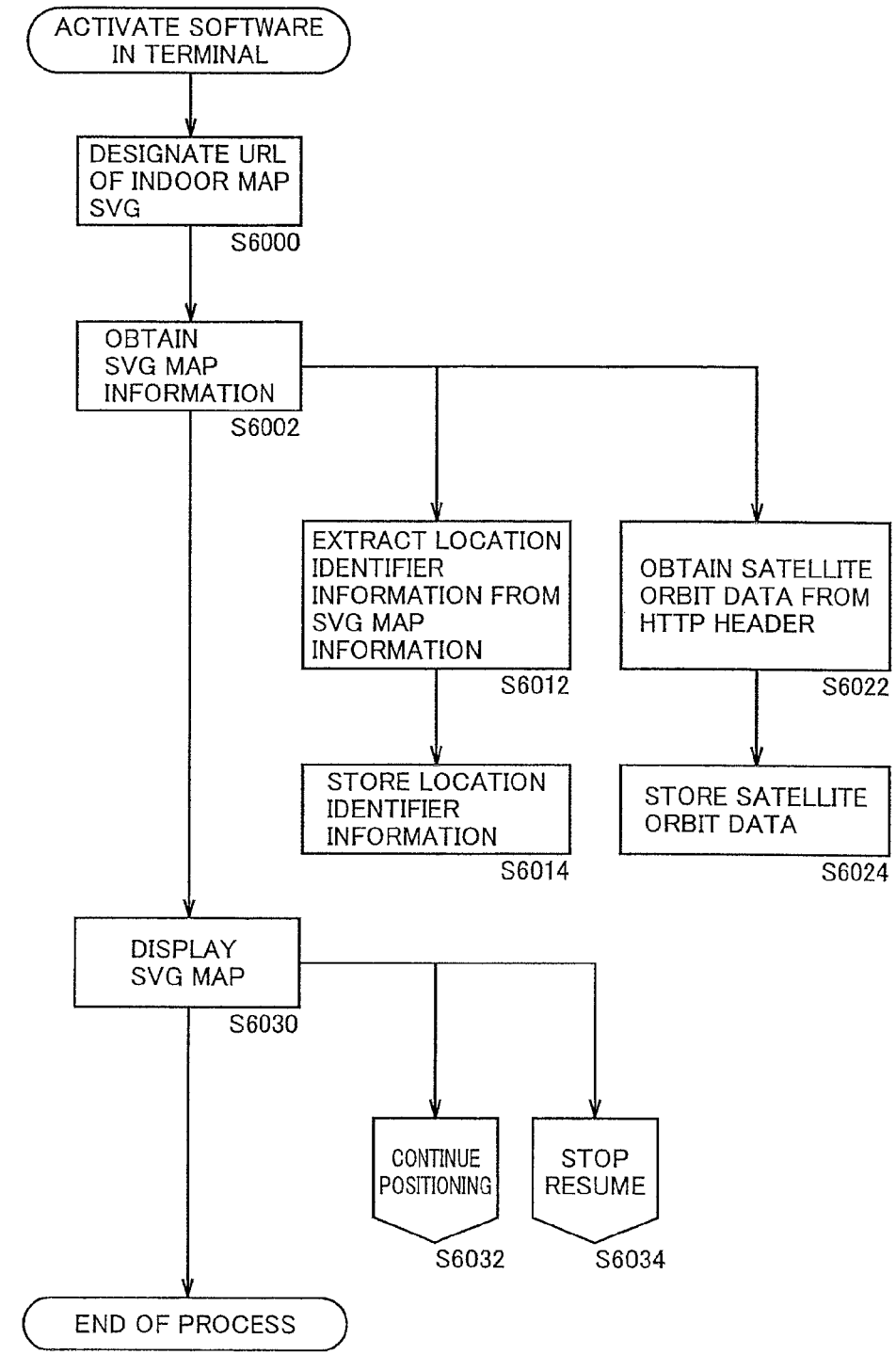
FIG. 23 is a first flowchart for illustrating an indoor positioning process (step S630 of FIG. 20) in a location information providing apparatus 100 of an Example 2.

FIG. 23 is a first flowchart for illustrating the indoor positioning process (step S630 of FIG. 20) in location information providing apparatus 100 of Example 2.

First, in location information providing apparatus 100, when operation of software for indoor positioning is activated, map rendering processing unit 436 specifies the URL of the SVG map information for the indoor map in accordance with the short URL received by means of the signal having a message type of 4 (step S6000).

Next, map rendering processing unit 436 obtains the SVG map information from data on information providing server 1230 as specified by the URL (step S6002). Then, map rendering processing unit 436 extracts, from the SVG map information, the conversion table in which the identification information of the indoor transmitter and the location information of the indoor transmitter are associated with each other (S6012), and stores it in memory 420 as the location identifier information (location identifier conversion table). Next, map rendering processing unit 436 obtains the satellite orbit information from the HTTP header of the SVG map information (S6022), and stores the satellite orbit data in memory 420 as Cookie of the browser (S6024).

Map rendering processing unit 436 displays, on the browser, the map corresponding to the SVG map information (S6030), and thereafter continuously performs the positioning process (S6032) or stops or resumes the positioning (S6034) in response to the user's operation.

Figure 24:
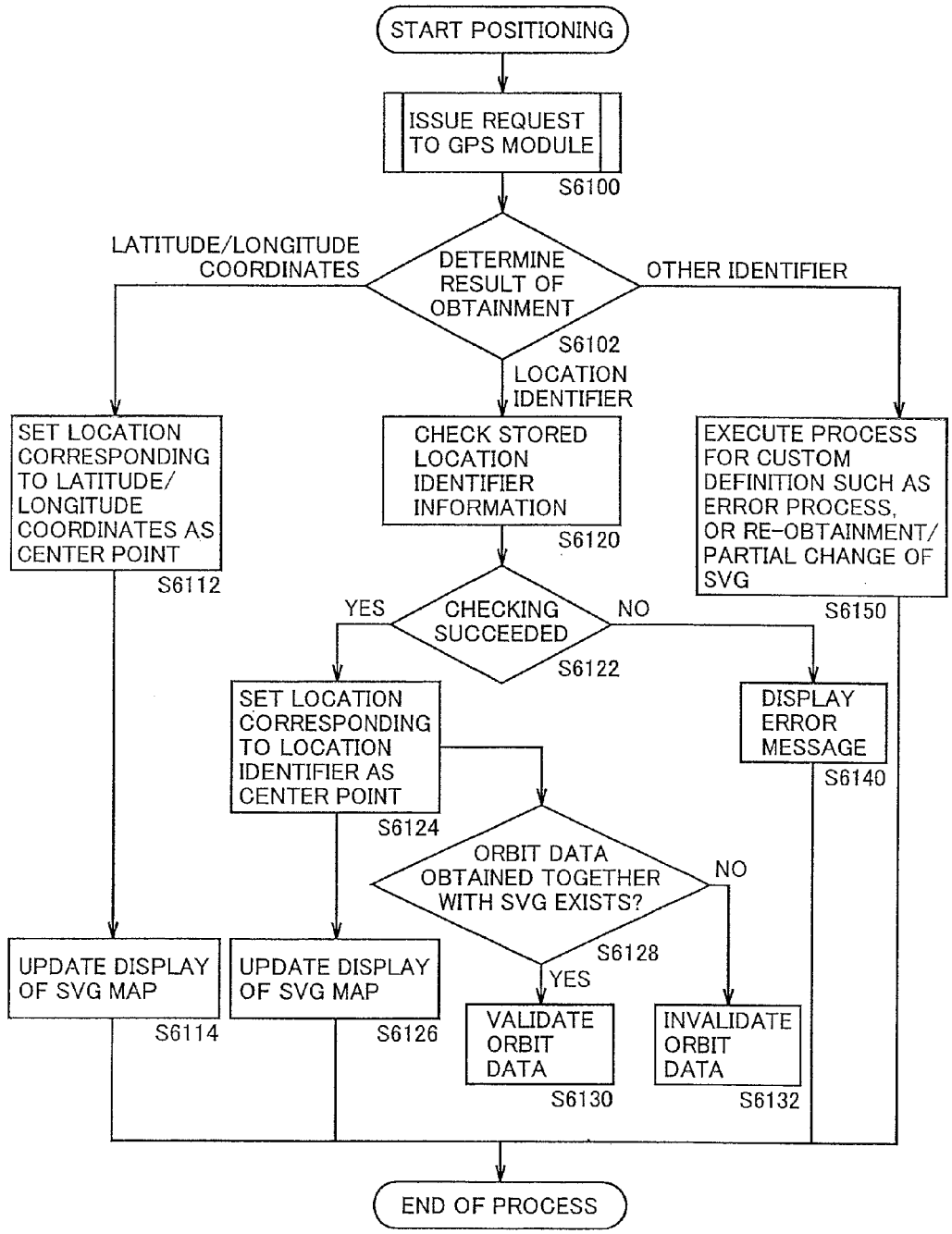
FIG. 24 is a flowchart for illustrating the positioning process in FIG. 23.

FIG. 24 is a flowchart for illustrating the positioning process in FIG. 23. It is assumed below that an outdoor map is also stored in memory 420 as map information employing the SVG technique. The outdoor map may be loaded from a predetermined medium to memory 420 in advance, or may be downloaded by communication unit 450 from information providing server 1230 and may be stored in memory 420.

Referring to FIG. 24, first, when the location information is obtained through an operation of baseband processor 412 (positioning request from the GPS satellite to the positioning module) (S6100), determining unit 416 determines the obtained information (S6102). When the obtained information represents latitude/longitude coordinates, determining unit 416 sets, as a center point, the location corresponding to the latitude/longitude coordinates (S6112), and updates and displays a map displayed in accordance with the SVG map information (S6114).

Meanwhile, when determining unit 416 determines that the obtained information is the identification information (transmitter ID (SID)) of the indoor transmitter (S6102), map rendering processing unit 436 checks the identifier received from indoor positioning unit 434 against the location identifier information (location identifier conversion table) stored in memory 420 (S6120). When map rendering processing unit 436 succeeds in checking (S6122), map rendering processing unit 436 sets, as the center point of the map, the location corresponding to the identifier (S6124), and updates the display of the map in accordance with the SVG map information (S6126). Further, when there exists satellite orbit data simultaneously obtained together with the SVG map information corresponding to the identifier successfully checked (S6128), map rendering processing unit 436 validates the satellite orbit data (S6130). When there does not exist the satellite orbit data simultaneously obtained together with the SVG map information (S6128), map rendering processing unit 436 invalidates the satellite orbit data (S6132).

Meanwhile, in step S6102, when it is determined that the identifier associated with the location is not obtained, map rendering processing unit 436 performs a predetermined process such as a predetermined error process, or re-obtainment/partial change of the SVG map information (S6150).

Figure 25:
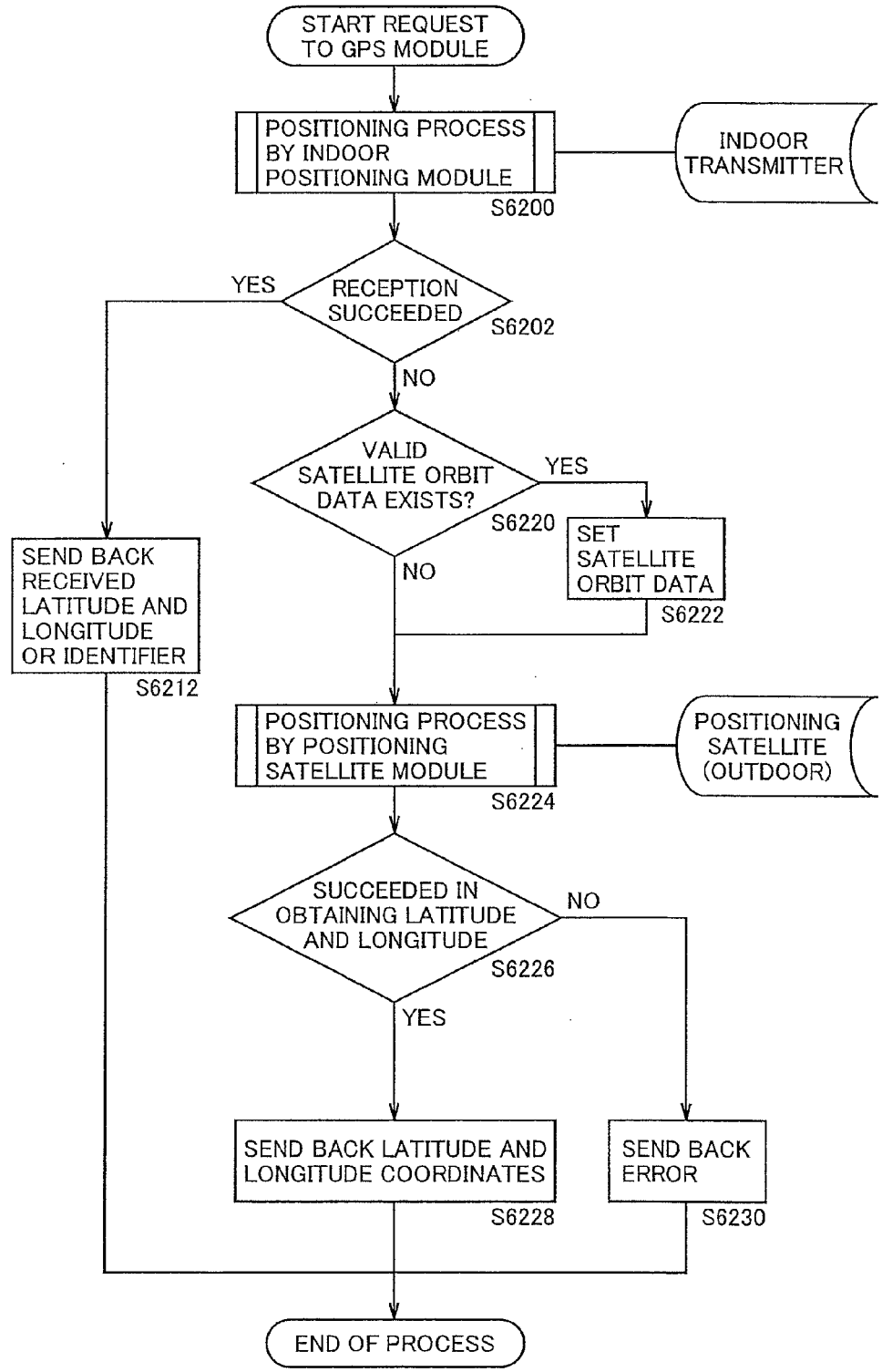
FIG. 25 is a flowchart for illustrating a flow of a process of an operation of a baseband processor 412 in FIG. 24 (positioning request from a GPS satellite to a positioning module).

FIG. 25 is a flowchart for illustrating a flow of the process of the operation of baseband processor 412 in FIG. 24 (positioning request from the GPS satellite to the positioning module).

Referring to FIG. 25, first, when baseband processor 412 and determining unit 416 are cooperated to attempt reception of an indoor positioning signal (S6200) and succeeds in receiving the indoor positioning signal (S6202), the received identifier of the indoor transmitter (or the latitude/longitude information of the installation location of the indoor transmitter depending on settings of the indoor transmitter) is sent back to map rendering processing unit 436 (S6212).

When the reception of the indoor positioning signal fails (S6202), determining unit 416 then determines whether or not there exists valid satellite orbit data (S6220). When the valid satellite orbit data exists, this data is set as satellite orbit data for outdoor positioning (S6222).

Then, when baseband processor 412 and outdoor positioning unit 432 are cooperated to receive a positioning signal from an outdoor positioning satellite (S6224) and succeeds in obtaining latitude/longitude information (S6226), the latitude/longitude information thus obtained (or information further related to the altitude) is sent back to map rendering processing unit 436 (S6228). Meanwhile, when outdoor positioning unit 432 fails the obtainment of the latitude/longitude information through the positioning signal from the outdoor positioning satellite, error information is sent back to map rendering processing unit 436 (S6230).

It is noted that when there exists no valid satellite orbit data in step S6220, cold start takes place to extract satellite orbit data from the positioning signal from the outdoor positioning satellite.

Accordingly, by obtaining the satellite orbit data at the area/time asynchronously or in background together with the reference/obtainment of the SVG container of Example 1, satellite positioning can be performed with less time loss when handing over from indoor positioning to outdoor positioning afterwards.

Namely, with the configuration described above, in addition to the effect exhibited by location information providing apparatus 100 of Example 1, positioning accuracy can be improved and positioning time can be shorter when handing over from indoor positioning to outdoor positioning.

In the description above, it is illustrated that the map information is such that the display data is exhibited using the SVG technique, and that the SVG data for this map display is configured to include the conversion table between the indoor transmitter's identifier transmitted from the indoor transmitter and the indoor transmitter's location information. With such a configuration (SVG container), the map information and the conversion table can be managed and distributed collectively. This facilitates the management and process in the location information server, advantageously.

However, the map information and the conversion table are not limited to such a configuration. For example, the following configurations can be employed:

1) The map information may be configured to be a digital map and be vector data that allows the map to be displayed in a scalable manner, and the conversion table may be configured to be distributed as separate data.

2) The indoor map information may be distributed as CAD data, and the conversion table, which indicates correspondence between a location on this CAD data and an identifier, may be distributed as separate data. In doing so, the CAD data may represent a vector image or a raster image. For ease of scaling up/down the map, the vector image is desirable.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

10: location information providing system; 110, 111, 112: GPS satellite; 120, 121, 122: transmitter; 100, 100-1, 100-2, 100-3, 100-4: location information providing apparatus; 130: building; 200, 200-1, 200-2, 200-3: indoor transmitter; 210: wireless I/F; 220: external synchronization link port; 221: external clock port; 230: reference clock I/O block; 240: digital processing block; 250: analog block; 1220: Internet.

The invention claimed is:

1. A navigation signal transmitting apparatus, installed in a facility on a ground, comprising:
a transmission antenna for transmitting a navigation signal to a mobile terminal capable of performing positioning by receiving spectrum spread satellite positioning signals from a plurality of positioning satellites;
a storage for storing identification information for specifying said navigation signal transmitting apparatus among a plurality of navigation signal transmitting apparatuses installed in said facility, and resource identification information for specifying a location of an external device on a network to obtain map information indicative of inside of said facility;
a message generator for generating a message signal of said identification information and said resource identification information to be included in said navigation signal;
a modulator for generating said navigation signal by modulating said message signal through a modulation process including a spectrum spread process based on the same type of a spread code as that of each of said satellite positioning signals, said spread code being allotted to said navigation signal transmitting apparatus in advance; and
a transmitter for transmitting said navigation signal from said transmission antenna,
wherein said transmitter is configured to further transmit an indoor map and a conversion table used by said mobile terminal for resolving a location,
wherein the identification information of each said navigation signal transmitting apparatus and the location of the navigation signal transmitting apparatus are interrelated by an ID on the indoor map at the conversion table, and
wherein a map information including the identification information is displayed on a monitor of the mobile terminal.

2. The navigation signal transmitting apparatus according to claim 1, wherein said navigation signal has a signal format compatible with a signal format of said satellite positioning signal.

3. The navigation signal transmitting apparatus according to claim 2, wherein said message generator is configured to generate the message signal including said identification information, in accordance with a signal format having the shortest signal repeating cycle among a plurality of signal formats compatible with the signal format of said satellite positioning signal.

4. The navigation signal transmitting apparatus according to claim 1, wherein the conversion table further comprises information for identifying a code used for the spectrum spread modulation.

5. A location information providing apparatus capable of performing positioning by receiving spectrum spread satellite positioning signals from a plurality of positioning satellites, and providing location information using a plurality of navigation signals, which are spread spectrum signals from a plurality of navigation signal transmitting apparatuses installed in a facility on a ground and which respectively include pieces of identification information for specifying said navigation signal transmitting apparatuses in said facility, comprising:
a receiver for receiving said spread spectrum signals;
a communication circuit for communicating with an external device on a network;
a memory for storing a plurality of patterns of spread codes for said navigation signals, said spread codes being of the same type as those for said satellite positioning signals;
demodulators provided in parallel for identifying and demodulating said plurality of navigation signals by performing correlation processes for said plurality of patterns of said spread codes in parallel;
an extractor for obtaining resource identification information for specifying a location of said external device on said network from the navigation signal from a predetermined one of said navigation signal transmitting apparatuses, and extracting said identification information from one of said plurality of navigation signals identified, when said navigation signals have been successfully identified and demodulated; and a map rendering processor for obtaining, from said external device using said communication circuit based on said resource identification information, map information for displaying a map of inside of said facility and correspondence information indicating a correspondence relation between said identification information and the location of said navigation signal transmitting apparatus in said facility, and generating an image signal for displaying an map image indicating a location of said navigation signal transmitting apparatus, from which said identification information has been received, on the map of the inside of said facility.

6. The location information providing apparatus according to claim 5, wherein said navigation signal has a signal format compatible with a signal format of said satellite positioning signal.

7. The location information providing apparatus according to claim 6, wherein said map information is data of a SVG (Scalable Vector Graphics) format, and said correspondence information is described as data of said SVG format.

8. The location information providing apparatus according to claim 7, wherein when obtaining said map information from said external device, said extractor is also configured to obtain satellite orbit data for said positioning satellites from said external device, said location information providing apparatus further comprising an outdoor positioning circuit for performing positioning using said satellite orbit data obtained from said external device, when performing positioning by receiving said satellite positioning signals from said plurality of positioning satellites.

9. The location information providing apparatus according to claim 6, wherein said correspondence information collectively includes correspondence relations between locations of said plurality of navigation signal transmitting apparatuses included in said map information and the plurality of pieces of identification information, and said demodulators are configured to perform said correlation processes using a selected one of said spread codes based on said correspondence information.

10. The location information providing apparatus according to claim 5, wherein the location information providing apparatus is further configured to resolve the location using the correspondence information after the map information is downloaded.

11. The location information providing apparatus according to claim 5, wherein the corresponding information includes information for identifying a code used for the spectrum spread modulation, and wherein identifying and demodulating said plurality of navigation signals include identifying said plurality of navigation signals based on the information for identifying a code.

12. A method for transmitting a navigation signal from a facility on a ground, comprising preparing identification information for specifying the navigation signal transmitting apparatus among a plurality of navigation signal transmitting apparatuses installed in said facility, and resource identification information for specifying a location of an external device on a network to obtain map information indicative of inside of said facility;

generating a message signal of said identification information and said resource identification information to be included in said navigation signal; generating said navigation signal by modulating said message signal through a modulation process including a spectrum spread process based on the same type of a spread code as that of each of said satellite positioning signals, said spread code being allotted to said navigation signal transmitting apparatus in advance; and transmitting said navigation signal from the transmission antenna to a mobile terminal capable of performing positioning by receiving spectrum spread satellite positioning signals from a plurality of positioning satellites; and transmitting an indoor map and a conversion table used by said mobile terminal for resolving a location, wherein the identification information of each said navigation signal transmitting apparatus and the location of the navigation signal transmitting apparatus are interrelated by an ID on the indoor map at the conversion table, and wherein a map information including the identification information is displayed on a monitor of the mobile terminal.

13. The method according to claim 12, wherein said navigation signal has a signal format compatible with a signal format of said satellite positioning signal.

14. The method according to claim 13, wherein said generating said message signal includes generating the message signal including said identification information, in accordance with a signal format having the shortest signal repeating cycle among a plurality of signal formats compatible with the signal format of said satellite positioning signal.

15. The method according to claim 12, wherein the conversion table further comprises information for identifying a code used for the spectrum spread modulation.

16. A method, which allows for positioning by receiving spectrum spread satellite positioning signals from a plurality of positioning satellites, for providing location information using a plurality of navigation signals, which are spread spectrum signals from a plurality of navigation signal transmitting apparatuses installed in a facility on a ground and which respectively include pieces of identification information for specifying said navigation signal transmitting apparatuses in said facility, comprising receiving said spread spectrum signals;

communicating with an external device on a network;

storing a plurality of patterns of spread codes for said navigation signals, said spread codes being of the same type as those for said satellite positioning signals;

identifying and demodulating said plurality of navigation signals by performing correlation processes for said plurality of patterns of said spread codes in parallel;

obtaining resource identification information for specifying a location of said external device on said network from the navigation signal from a predetermined one of said navigation signal transmitting apparatuses, and extracting said identification information from one of said plurality of navigation signals identified, when said navigation signals have been successfully identified and demodulated; and obtaining, from said external device based on said resource identification information, map information for displaying a map of inside of said facility and correspondence information indicating a correspondence relation between said identification information and the location of said navigation signal transmitting apparatus in said facility, and generating an image signal for displaying an map image indicating a location of said navigation signal transmitting apparatus, from which said identification information has been received, on the map of the inside of said facility.

17. The method according to claim 16, wherein said navigation signal has a signal format compatible with a signal format of said satellite positioning signal.

18. Tice method according to claim 17, wherein said map information is data of a SVG (Scalable Vector Graphics) format, and said correspondence information is described as data of said SVG format.

19. The method according to claim 18,
wherein when obtaining said map information from said external device, said extracting includes also obtaining satellite orbit data for said positioning satellites from said external device, the method further comprising performing positioning using said satellite orbit data obtained from said external device, when performing positioning by receiving said satellite positioning signals from said plurality of positioning satellites.

20. The method according to claim 17, wherein said correspondence information collectively includes correspondence relations between locations of said plurality of navigation signal transmitting apparatuses included in said map information and the plurality of pieces of identification information, and said demodulating includes the step of performing said correlation processes using a selected one of said spread codes based on said correspondence information.

* * * * *